United States Patent
Staszel et al.

(10) Patent No.: US 12,463,882 B2
(45) Date of Patent: Nov. 4, 2025

(54) DETERMINING A CONDITION OF NETWORK COMMUNICATION BETWEEN SERVERS BY DETECTING CHANGES IN SUB-USER DATA

(71) Applicant: Klaviyo, Inc, Boston, MA (US)

(72) Inventors: Lilia Staszel, Cambridge, MA (US); Olof Jacobson, London (GB); Harsh Mehta, Boston, MA (US)

(73) Assignee: Klaviyo, Inc, Boston, MA (US)

( * ) Notice: Subject to any disclaimer, the term of this patent is extended or adjusted under 35 U.S.C. 154(b) by 0 days.

(21) Appl. No.: 18/665,835

(22) Filed: May 16, 2024

(65) Prior Publication Data

US 2024/0305549 A1   Sep. 12, 2024

Related U.S. Application Data

(63) Continuation-in-part of application No. 17/860,277, filed on Jul. 8, 2022, now Pat. No. 12,112,343.

(60) Provisional application No. 63/313,636, filed on Feb. 24, 2022.

(51) Int. Cl.
*H04L 43/062* (2022.01)
*H04L 43/16* (2022.01)

(52) U.S. Cl.
CPC ............ *H04L 43/062* (2013.01); *H04L 43/16* (2013.01)

(58) Field of Classification Search
CPC ........ H04L 43/062; H04L 43/16; H04L 43/04
See application file for complete search history.

(56) References Cited

U.S. PATENT DOCUMENTS

| | | |
|---|---|---|
| 7,505,868 B1 | 3/2009 | Shan |
| 7,809,781 B1 | 10/2010 | Shan |
| 7,953,280 B2 | 5/2011 | Theiler et al. |
| 9,767,474 B1 | 9/2017 | Ramalingam et al. |
| 10,864,031 B2 | 12/2020 | Mazor et al. |

(Continued)

FOREIGN PATENT DOCUMENTS

WO   2016088109 A1   6/2016

OTHER PUBLICATIONS

Performing Customer Behavior Analysis using Big Data Analytics, Anindita A Khade, Procedia Computer Science 79 (2016) 986-992.

(Continued)

*Primary Examiner* — Jerry B Dennison
(74) *Attorney, Agent, or Firm* — Brian R. Short

(57) ABSTRACT

Apparatuses, methods, and systems for detecting changes in periodic sub-user behavior data for determining a condition of a network are disclosed. One method includes sensing the user data of sub-users, calculating a plurality of thresholds based on a size of the user data, calculating a rolling mean for each sub-period of a larger period, generating difference values based on comparing current sub-period values to corresponding sub-period rolling mean, accumulating a cumulative sum based the difference values, detecting an anomaly based on comparing the cumulative sum with the plurality of thresholds, detecting a condition of a state of communication between the user server and the platform server when the comparing of the cumulative sum with the plurality of threshold exceeds a condition detection threshold, and feeding the condition of the state of communication back to the user server when the condition is detected.

20 Claims, 12 Drawing Sheets

(56) References Cited

U.S. PATENT DOCUMENTS

| | | |
|---|---|---|
| 10,951,500 B2* | 3/2021 | Lu .................... H04L 43/062 |
| 11,270,312 B1 | 3/2022 | Jass |
| 11,663,297 B2 | 5/2023 | Boyapalle et al. |
| 12,112,343 B2 | 10/2024 | Jacobson et al. |
| 2002/0136430 A1 | 9/2002 | Rhoads |
| 2009/0307028 A1 | 12/2009 | Eldon et al. |
| 2010/0106586 A1 | 4/2010 | Etheredge et al. |
| 2012/0086573 A1 | 4/2012 | Bischoff et al. |
| 2013/0290096 A1 | 10/2013 | Lizotte, III |
| 2013/0325770 A1 | 12/2013 | Heidasch |
| 2015/0046224 A1 | 2/2015 | Adjaoute |
| 2016/0162917 A1 | 6/2016 | Singh et al. |
| 2016/0302709 A1 | 10/2016 | Mossbridge |
| 2017/0083937 A1 | 3/2017 | Fadli |
| 2017/0094361 A1 | 3/2017 | Thomas et al. |
| 2017/0236060 A1 | 8/2017 | Ignatyev |
| 2018/0053114 A1 | 2/2018 | Adjaoute |
| 2018/0096365 A1 | 4/2018 | Noyes et al. |
| 2018/0248902 A1 | 8/2018 | Dănilă-Dumitrescu et al. |
| 2019/0164181 A1 | 5/2019 | Adjaoute |
| 2019/0228329 A1 | 7/2019 | Utsumi et al. |
| 2019/0373007 A1 | 12/2019 | Salunke et al. |
| 2019/0377818 A1 | 12/2019 | Andritsos |
| 2020/0067861 A1 | 2/2020 | Leddy et al. |
| 2020/0322703 A1 | 10/2020 | Bures et al. |
| 2021/0004682 A1 | 1/2021 | Gong et al. |
| 2021/0326586 A1 | 10/2021 | Sorci et al. |
| 2023/0089904 A1 | 3/2023 | Prasad et al. |
| 2023/0169272 A1 | 6/2023 | Brantley et al. |
| 2023/0267479 A1* | 8/2023 | Jacobson ............ G06Q 30/0202 705/7.29 |
| 2023/0267480 A1 | 8/2023 | Jacobson et al. |
| 2023/0269264 A1 | 8/2023 | Yao et al. |
| 2024/0305549 A1* | 9/2024 | Staszel .................... H04L 43/16 |
| 2024/0420165 A1 | 12/2024 | Jacobson et al. |

OTHER PUBLICATIONS

Al-Mashraie, Mohammed, Sung Hoon Chung, and Hyun Woo Jeon. "Customer switching behavior analysis in the telecommunication industry via push-pull-mooring framework: A machine learning approach." Computers & Industrial Engineering 144 (2020): 106476 (Year: 2020).

Ifram Ismath and Abarnah Kirupananda, TrustCredit—An Individual Credit Scoring Mechanism Using Alternative Mobile Interactions Touchpoints, IEEE Region 1—Symposium, 2021.

V. R. Bracamonte Lesma and H. Okada, "Feedback and trust-related factors of consumer behavior in cross-border electronic commerce," 2012 IEEE Conference on Technology and Society in Asia (T&SA), Singapore, 2012, pp. 1-5 (Year: 2012).

* cited by examiner

| Day | Daily count of viewed product events |
|---|---|
| 2022-01-01 | 100 |
| 2022-01-02 | 121 |
| 2022-01-03 | 113 |
| 2022-01-04 | 93 |
| 2022-01-05 | 140 |
| 2022-01-06 | 102 |
| 2022-01-07 | 98 |

*FIG. 4*

DETERMINING A CONDITION OF NETWORK COMMUNICATION BETWEEN SERVERS BY DETECTING CHANGES IN SUB-USER DATA

RELATED PATENT APPLICATION

This patent application is a continuation-in-part (CIP) of U.S. patent application Ser. No. 17/860,277, filed Jul. 8, 2022 which claims priority to Provisional Patent Application Ser. No. 63/313,636 filed Feb. 24, 2022, which are herein incorporated by reference.

FIELD OF THE DESCRIBED EMBODIMENTS

The described embodiments relate generally to networking of servers. More particularly, the described embodiments relate to systems, methods, and apparatuses for determining a condition of network communication between servers by detecting changes in sub-user data.

BACKGROUND

A condition of a network can be determined by analyzing data being transported by the network. For example, changes detected in the data can indicate a problem with the network. In general, a change detection system tries to identify when the output distribution of a process has changed. Change detection becomes extra difficult when the output distribution of the process is unknown to begin with. This means the change detection system must try to determine both what the normal output of the process is, as well as if, and when a change has occurred from this normal state.

It is desirable to have methods, apparatuses, and systems for determining a condition of network communication between servers by detecting changes in sub-user data.

SUMMARY embodiment includes a computer-implemented system or apparatus for determining a condition of network communication between servers. The system or apparatus includes a user server electronically connected to a plurality of sub-user devices, the user server operative to detect sub-user data from the sub-user devices, and a platform server electronically connected to the user server. The platform is configured to receive the sub-user data of the sub-users from the user server, calculate a plurality of thresholds based on a size of the sub-user data, calculate a rolling mean for each sub-period of a larger period, generate difference values based on comparing current sub-period values to corresponding sub-period rolling mean, accumulate a cumulative sum based the difference values, detect at least one anomaly based on comparing the cumulative sum with the plurality of thresholds, detect a condition of a state of communication between the user server and the platform server when the comparing of the cumulative sum with the plurality of thresholds exceeds a condition detection threshold, and feed the condition of the state of communication back to the user server when the condition is detected.

An embodiment includes a computer-implemented method of detecting changes in sub-user behavior data for determining a state of communication between a user server and a platform server of a network. The method includes sensing the user data of sub-users, calculating, by the platform server, a plurality of thresholds based on a size of the user data, calculating, by the platform server, a rolling mean for each sub-period of a larger period, generating, by the platform server, difference values based on comparing current sub-period values to corresponding sub-period rolling mean, accumulating, by the platform server, a cumulative sum based the difference values, detecting, by the platform server, an anomaly based on comparing the cumulative sum with the plurality of thresholds, detecting, by the platform server, a condition of a state of communication between the user server and the platform server when the comparing of the cumulative sum with the plurality of threshold exceeds a condition detection threshold, and feeding, by the platform server, the condition of the state of communication back to the user server when the condition is detected.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 is a table that shows sub-user actions, according to an embodiment.

DETAILED DESCRIPTION

The embodiments described include methods, apparatuses, and systems for determining a condition of network communication between servers by detecting changes in sub-user data. For an embodiment, the network or apparatus includes a user server, a plurality of sub-user devices, and a platform server. For at least some embodiments, corrective or informational electronic communication from the platform server to the user server is generated upon detecting the changes in the sub-user data. For an embodiment, the detected changes that indicate a conditional state in communication change between the servers of the network. For at least some embodiments, the electronic communication is correlated with an action or activity of a sub-user. Once correlated, action can be automatically taken based on the detected correlation. For an embodiment, the conditional state indicates a problem with communication of the sub-user data from the user server to the platform server. For an embodiment, once correlated, automatic action can be taken to correct the problem. An additional embodiment includes detection of a sub-condition of the state of communication between the user server and the platform server. That is, the processing for detecting the conditional state in communication change between the servers of the network can additionally be used for detecting the sub-condition when the conditional state is not detected. The sub-condition can be correlated with actions of the sub-user, which can then be used to improve a user-interface provided to the sub-users.

Figure 1:
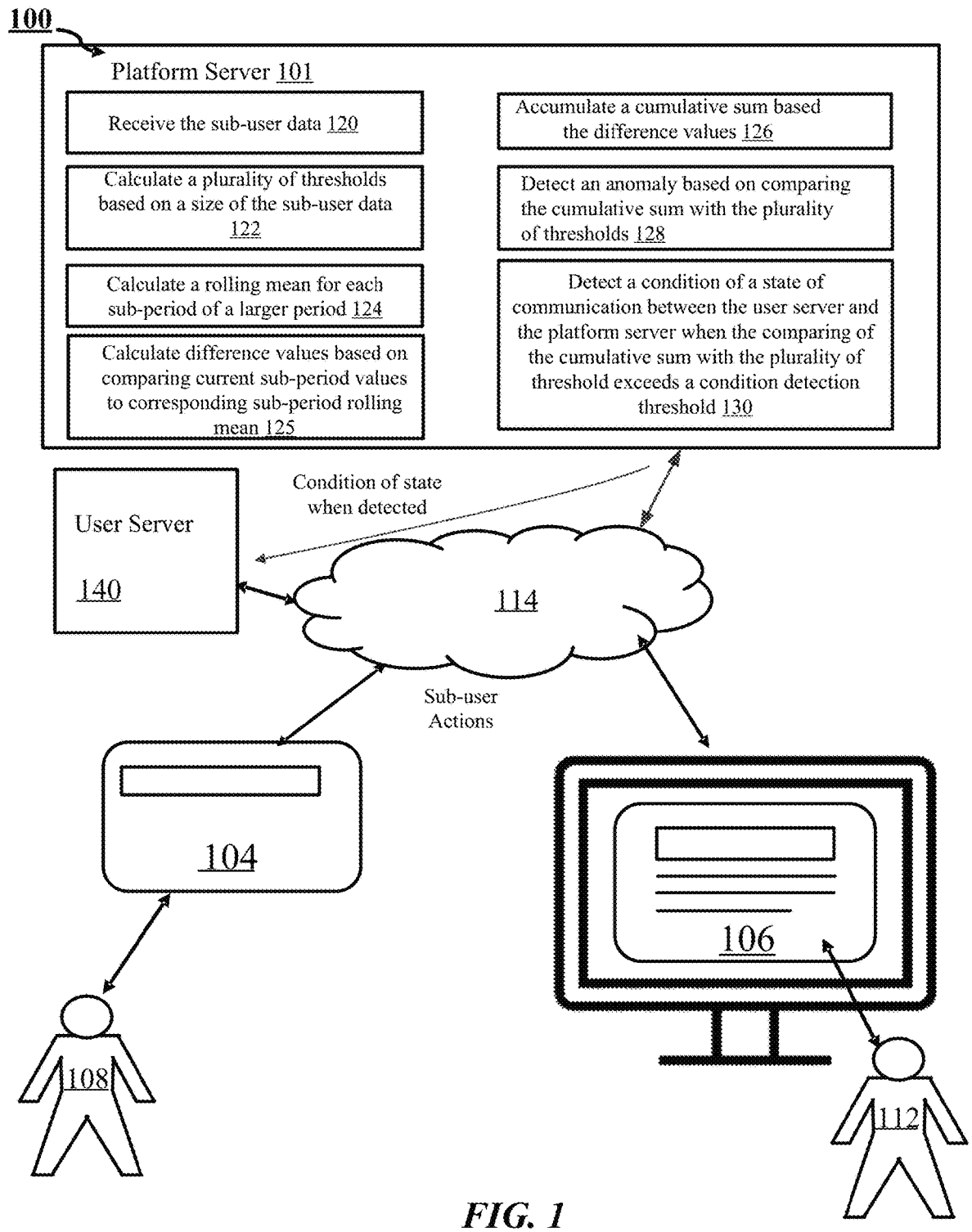
FIG. 1 shows a system for determining a condition of network communication between servers of a network by detecting changes in sub-user data, according to an embodiment.

FIG. 1 shows a system for determining a condition of network communication between servers of a network by detecting changes in sub-user data, according to an embodiment. The system 100 includes a platform server 101. For an embodiment, the platform server 101 is electronically connected through a sub-network 114 to electronic devices 104, 106 of sub-users 108, 112 of the user. For an embodiment, the sub-users 108, 112 are the site visitors (visitors of a website of the user) in which changes in periodic behavior (actions of sub-user data) are detected.

For an embodiment, a user server 140 of the user operates and manages a website. For an embodiment, the user server 140 includes a server of a business of the user that operates to directly control the website. For an embodiment, the user server 140 includes a combination of the business and a third party to operate to control the website. For an embodiment, the user of the user server 140 is a customer of the operator of the server 101. For an embodiment, the user server 140 is operated by a combination of the customer of the operator of the server 101 and a third party (such as a Shopify platform).

For an embodiment, the platform server 101 includes a platform in which data is synced from other sources, such as, third party websites and devices of sub-users of the users. For an embodiment, the platform server 101 continuously monitors the rate at which data (for example, sub-user data) is coming into the platform of the platform server 101 to detect when a problem has occurred with the data syncing process.

For an embodiment, the data comes into the platform server 101 through integrations set up by website managers (such as, the user or an operator of the user server 140). For an embodiment, the integrations are not exclusively between the platform and other third-party platforms. For an embodiment, a custom integration with the marketing automation platform of the server 101 is possible through APIs (Application Programming Interfaces) which provides the user (user server 140) a great deal of freedom in how to communicate data to the platform server 101.

A simple example of a use case for communicating sub-user data to the platform server 101 is when a user of the user server 140 sends an order confirmation message to one of their sub-users (108, 112) using the platform server 101. Order confirmation messages are sent after an order has been placed, and the platform server 101 needs to know when the sub-user has placed an order. In some cases, the way in which integrations or parts of integrations are set up can be fragile. For example, in some cases the operator of the user server 140 installs their own code snippets that communicate data to the platform server 101 directly on their websites. In such cases, the operator of the user server 140 could accidentally disrupt or break their code snippets when making routine updates or changes to their website. An example would be if an operator of the user server 140 accidentally deletes the closing bracket of an installed code snippet. To the operator of the user server 140 it might look like everything should be working because most of the code is still there, but the data the snippet was meant to send likely stops being transferred to the platform of the server 101. This means that a platform of the server 101 functionality dependent on that data will stop working. The platform server 101 would not be able to directly tell if a code snippet has been changed because the code snippet is part of the user's platform and not the platform of the server 101. All the platform server 101 can do is try to detect when something changes in the rate at which data is getting synced over to the platform. At least some of the described embodiments for detecting changes in sub-user behavior of a user provide the platform server 101 the ability to identify when data provided by the user server 140 stops working. Information about the data not working can be conveyed back to the user or the operator of the user server 140 so that appropriate correction(s) can be implemented to correct the detected problem(s). Accordingly, the described embodiments provide a solution to the problem of a platform server 101 determining a condition of a network that includes the platform server 101, a user server 140, and sub-user devices 104, 106 that are interconnected through a sub-network 114. As described, actions and/or configurations of the user server 140 may cause data being provided by the user server 140 to the platform server 101 to be faulty. As described, for an embodiment, the platform server 101 makes this determination by detecting certain changes in the behavior of data (sub-user data) being received by the platform server 101. Once detected, the problem conditions have been identified, the server may alert the user, or the server may operate to automatically correct the problem. Once monitored, the sub-user data can also be used to identify the effects of other actions by the user of the user server 140.

For an embodiment, a manager of the system 100 operates to detect sub-user data of, for example, site visitors 108, 112 of electronic devices 104, 106. Changes in the detected sub-user data can be used to determine an action or activity that either causes sub-user data to stop being communicated to the platform of the server 101 or causes the sub-user data to greatly change.

Sub-User Data

For an embodiment, a sub-user device (such as, devices 104, 106) alone or in conjunction with the user server 140 operates to sense the sub-user data. For an embodiment, the sensed user data includes the user device electronically sensing a sub-user performing an action or activity.

While the described embodiments are directed towards sensing sub-user data, it is to be understood that at least some other embodiments can additionally or alternatively include the sensing of other types of data as well. For an embodiment, the sensed data can include user server data, such as, daily total or new visitors on the user website. That is, the sensed sub-user data could be replaced with, for example, data of daily total or new visitors on the user website of the user.

The sub-user and sub-user data may be tracked (counted) over various possible time periods (such as, by the second, minute, hour, day, week, or month) and may include one or more of sub-users (108, 112) being active on the user website of the user server 140, a sent email bouncing, a sub-user canceled order, a sub-user starting a checkout, a sub-user clicking (selecting) an email, a sub-user opening email, a sub-user placing order, a sub-user receiving email, a sub-user refunding an order, a sub-user unsubscribing, a sub-user viewing a product, a sub-user adding to a list (a list in the platform server 101 account), and/or a sub-user adding an item to their cart.

It is to be understood, however, that there are very few limitations on what event types (sub-user data) can be published (provided) to a platform of the server 101 account. Website managers (users of the user servers 140) can implement their own events (sensed sub-user actions) that make sense for their business and simply send those events over to the marketing automation platform of the server 101. For at least some embodiments, the change detection system is applied to counts of those event types (sensed user actions) as well.

Further, as will be described, implementations of computing devices 104, 106 that include mobile devices can additionally or alternatively include additional types of sensed sub-user data. Such sensed sub-user data can include sensing a physical sub-user visit and/or purchase. That is, the sensing of the sub-user action can include sensing the sub-user visiting a physical location of the user, and/or the sub-user purchasing a product or service of the user at a physical store location of the user. Further, the sensed sub-user data can include combinations or sequences of sub-user actions. For an embodiment, sensed sub-user actions are weighted based on the sensed sub-user data. For an embodiment, only sensed sub-user actions having a weight, or a combination of weights that exceed a sub-user action threshold are considered sub-user data for the purposes of detecting changes in sub-user data.

For an embodiment, when the sub-user loads a webpage of the user, user-tracking code is loaded in through a JavaScript bundle and utilized within the browser of the sub-user. For an embodiment, actions of the sub-user on the website of the user can be tracked by the user-tracking code. Further, a mobile device of a sub-user can be tracked to determine other possible actions of the sub-user. For an embodiment, behavior of the sub-user's internet browser or device (that would affect communication of a message or a sub-user's desired action) can be monitored or tracked. For an embodiment, navigation by the sub-user to a website or URL (universal resource locator) can be sensed, tracked, and monitored by the user-tracking code.

For an embodiment, the user-tracking code can utilize sensors on the computing device of the sub-user to track actions of the computing device. For example, the computing device may be a mobile device that includes motion and location sensors that can identify actions of the sub-user that can be correlated with the sub-user having loaded the webpage of the user. Further, actions of multiple sub-users can be sensed to determine correlations between different sub-users who have loaded the webpage of the user. The correlations between sub-users can be used to establish relationships between the sub-users. Further, the correlations can be used to characterize sub-users for improving a user interface with each of the sub-users.

Communicating Data to the Platform Server

For at least some embodiments, data is sent (provided) to the platform server 101 through either webhooks, periodic syncs, sent to the API (application programming interface) of the marketing automation platform of the server 101, or some other means. Webhooks are automated messages that are sent shortly after an event occurs from another system such as an ecommerce platform. For an embodiment, periodic syncs are periodic tasks that are executed within the marketing automation platform of the server 101 to query 3rd-party systems or APIs for data. Such systems are in many cases integrated ecommerce platforms. For an embodiment, the marketing automation platform of the server 101 also maintains an API with which users of the user server 140 can send data to their accounts themselves.

For an embodiment, the platform server 101 operates (120) to sense or receive the sub-user (action) data from the user server 140 over a period of time. For an embodiment, the period of time is set or selected by the user server 140 and can be set in real-time, or every 5 minutes, or every 30 minutes, or every hour and so on. For an embodiment, the period is selected based on a rate in which the sub-user data is sensed or provided.

It is to be understood that the sub-user data may or may not be periodic. However, at least some of the described embodiments perform better when the sub-user data is periodic.

For an embodiment, the server 101 further operates (122) to calculate a plurality of thresholds based on a size of the periodic user data. For example, the periods of the periodic user data may be one day, and the size of the periodic data may be one week. In this case, seven different thresholds may be detected to represent each day of the week. Here, the number of the plurality of thresholds is determined by how many sub-periods are within a larger period.

For an embodiment, the server 101 further operates (124) to calculate a rolling mean for each sub-period of a larger period. Here, each sub-period may be a day, and the larger period is a week. For an embodiment, the sub-periods repeat within each of multiple larger periods. Again, the number of the plurality of thresholds is determined by how many sub-period are within a larger period.

For an embodiment, the server 101 further operates (125) to generate difference values based on comparing current sub-period values to corresponding sub-period rolling mean. That is, a difference value is generated for each of the sub-periods. For an embodiment, the current sub-period values are the number of events (actions of the sub-users) that the system receives on a given sub-period, which for an embodiment, is the most recent sub-period.

For an embodiment, the server 101 further operates (126) to accumulate a cumulative sum based on the difference values generated for each of the sub-periods. That is, the difference values are summed.

For an embodiment, the server 101 further operates (128) to detect an anomaly based on comparing the cumulative sum with the plurality of thresholds. That is, an embodiment includes detecting a condition of a state of communication between the user server and the platform server when the comparison of the cumulative sum with the plurality of thresholds exceeds a condition detection threshold. The condition detection threshold is set to a value consistent with a larger than expected change in the comparison of the cumulative sum with the plurality of thresholds. An embodiment includes feeding the condition of the state of communication back to the user server when the condition is detected.

Plurality of Thresholds

For at least some embodiment, the thresholds change based on patterns in the sub-users data and adapt to the average volume of events over time. For an embodiment, if the platform of the server 101 senses large volumes of events (sub-user data) come in, the server will adapt to react faster by lowering the threshold needed to trigger an alert. For an embodiment, if the platform of the server 101 senses lower volumes of events (sub-user data) over time, the platform automatically reacts to make the threshold needed larger, resulting in longer reaction times to reduce the chances of a false alarm. For a specific embodiment, the volume of events is calculated based on an average of the last 30 days (or some other selected time period) of event volume. If the volume is less than 400, the square root of that volume is subtracted from 20 and divided by 20 to give a percent that is then added to the minimum threshold to determine a final threshold somewhere between the minimum and maximum threshold. For an embodiment, calculating the plurality of thresholds based on the size of the periodic user data includes calculating a volume of events of sub-user data based on an average of a last N sub-periods of event volume, and determining each of the plurality of thresholds based on the calculated volume of events, and previously determined minimum and maximum thresholds. For an embodiment, the minimum and maximum thresholds are determined experimentally from a sample of manually identified and labeled anomalies to maximize performance and adapt to detection of anomalies of all types. This allows the platform of the server to automatically react faster when the platform is more certain that an anomaly is occurring, while preventing false alarms in noisy data.

Rolling Mean for Each Sub-Period

For an embodiment, the rolling mean is calculated for each subperiod based on the weekly (or some other selected period) patterns for that data. For example, if a sensor is tracking the number of packages shipped on a given day, there will likely be lower volumes on the weekend when the warehouse is closed. For an embodiment, an exponentially weighted moving average is calculated for each day of the week based on the volume of events for that day of the week over the past 90 days. By separating out the averages in this way, the platform of the server is able to adapt to daily fluctuations in any type of data and automatically adjust its expectations for what is normal. For an embodiment, this allows the system to detect changes in the overall data without being too sensitive to data that is noisy by nature.

Action Taken Upon Detection of Anomaly

For an embodiment, the platform server 101 further operates to detect (130) a condition of a state of communication between the user server and the platform server when the comparison of the cumulative sum with the plurality of thresholds exceeds a condition detection threshold. For an embodiment, this indicates that the sub-user has greatly changed which can be used as an indication that the sub-user data being provided to the platform server is no longer valid data. Accordingly, it is assumed that somehow the sensing, collecting, or communicating of the sub-user data broke. For an embodiment, the condition detection threshold is based on the plurality of thresholds, which for an embodiment, are determined through simulation and experimentation of historical and theoretical scenarios for which a sub-user's data had issues.

For an embodiment, the platform server 101 further operates to feed the condition of the state of communication back to the user server 140 when the condition is detected. That is, for an embodiment, the platform server 101 operates to feed the condition of the state back to the user server which provides a communication update to the user of the user server indicating failure of communication of the sub-user data between the user server and the platform server. Accordingly, action may be taken to fix the sensing, collecting, or communicating of the sub-user data. For an embodiment, the feedback includes an electronic message to the user which allows the user to troubleshoot the problem upon being notified.

For an embodiment, feeding the condition back to the user server includes controlling an update of a website of the user. For an embodiment, controlling the update of the website includes automatically updating the website to a version implemented before the detection of the condition. For an embodiment, the feedback includes the platform server 101 automatically providing control to restore the operation of the website of the user to the state the website was at before the condition was detected. As previously described, in some cases the operator of the user server 140 installs their own code snippets that communicate data to the platform server 101 directly on their websites. In such cases, the operator of the user server 140 could accidentally disrupt or break their code snippets when making routine updates or changes to their website. An example would be if an operator of the user server 140 accidentally deletes the closing bracket of an installed code snippet. To the operator of the user server 140 it might look like everything should be working because most of the code is still there, but the data the snippet was meant to send likely stops being transferred to the platform of the server 101. This means that a platform of the server 101 functionality dependent on that data will stop working. For an embodiment, the platform server 101 may direct and automatically update the website to operate as the website did before the condition was detected. For example, if the website is controlled by a version 1.12 after the condition was detected but controlled by version 1.11 before the condition was detected, the platform server 101 may automatically direct an updating of the website back to version 1.11 (a previous version in which no problems were detected).

For an embodiment, the platform server 101 is further configured to detect a sub-condition of the state of communication between the user server 140 and the platform server 101 when the comparing of the cumulative sum with the plurality of threshold is compared with a sub-condition detection threshold, wherein the sub-condition detection threshold is different than the condition detection threshold. Here, the condition is not detected, so the state of the connection between the user server 140 and the platform server 101 is assumed to be fine. However, the sub-user data change detection processing may be used to detect other changes that may have occurred which have caused a detected change in the sub-user data. For an embodiment, the sub-condition detection threshold is greater than the condition detection threshold. For an embodiment, the sub-condition detection threshold is less than the condition detection threshold. Regardless, the detected sub-condition indicates that something else has caused a large change in the sub-user data.

For an embodiment, the platform server is further configured to correlate the detection of the sub-condition with an activity of the user of the user-server. Actions may include a new (or a change in) electronic messages sent to sub-users, a change in recipients of the electronic messages, a change in send times of the electronic messages. For an embodiment, the change in the electronic messages includes a change in a display of the electronic message (as shown, for example, in FIG. 12). Accordingly, the described embodiments provide for an improved user interface by detecting when a display to sub-users results in either a very positive (recipient sub-user reacts to the display) or a very negative response (no reaction from the recipient sub-user). A display of the electronic messages that is positive is reused at a greater rate, whereas a display of the electronic messages that is negative can be eliminated. Accordingly, the user interface of the sub-users improves over time. For an embodiment, a better user interface is more likely to evoke a response from a recipient sub-user.

For an embodiment, the platform server is further configured to receive the sub-user data over a period of time, determine sub-user parameters including a mean, and a standard deviation of the sub-user data, determine a modified noise factor based on a value of the sub-user data to make change detection more sensitive to certain values, calculate a value of deviation from expectation based at least on the mean, the standard deviation, and the modified noise factor, calculate a current cumulative sum value of the user data based on a prior cumulative sum value and the value of the deviation from expectation, compare the current cumulative sum value with a preselected threshold, detect the condition of the state of communication between the user server and the platform server when the current cumulative sum value satisfies a compared condition with the preselected threshold, and feed the condition of the state of communication back to the user server when the condition is detected.

For an embodiment, the platform server is further configured to generate a normalization value when the standard deviation is detected to be less than a deviation threshold, wherein calculating the value of deviation from expectation is based at least on the mean, the normalization value, and the modified noise factor. For an embodiment, the deviation threshold is determined by experimentally observing results on a manually labeled dataset for different values of the deviation threshold. For an embodiment, the modified noise factor is used in a last step in calculation of a deviation from expectation, and wherein when the sub-user data and a historical mean are less than a preselected fraction of the normalization value, then the sub-user data and the historical mean provide a deviation from expectation value that is either zero or positive. For an embodiment, the modified noise factor controls how sensitive the change detection system is to changes in the sub-user data.

For an embodiment, the platform server 101 is further configured to receive the sub-user data over a period of time, determine sub-user parameters including a mean, and a standard deviation of the sub-user data, generate a normalization value based on the standard deviation when the standard deviation is detected to be less than a deviation threshold, calculate a value of deviation from expectation based at least on the mean, the normalization value, and a noise factor, calculate a current cumulative sum value of the sub-user data based on a prior cumulative sum value and the value of the deviation from expectation, compare the current cumulative sum value with a preselected threshold, detect a condition of a state of communication between the user server and the platform server when the current cumulative sum value satisfies a compared condition with the preselected threshold, and feed the condition of the state of communication back to the user server when the condition is detected.

For an embodiment, the platform server 101 is further configured to detect a value change of the sub-user data, and generate a revised representation of the user data when the value change between the user data and the previous determined mean, is detected to be greater than a change threshold, wherein the sub-user parameters including a mean, and a standard deviation of the revised representation sub-user data. For an embodiment, the revised representation of the sub-user data is lower. For an embodiment, the platform server 101 is further configured to determine the change threshold based on previously calculated mean and standard deviation of the sub-user data, and an inertia threshold, wherein the inertia threshold is experimentally determined by checking various values of the inertia threshold and determining a performance based on a manually labeled dataset. For an embodiment, the revised representation of the sub-user data is adaptively determined based on previously calculated mean and standard deviation of the sub-user data, an increase factor, and an inertia threshold, wherein the increase factor is experimentally determined by checking various values of the increase factor and determining a performance with a manually labeled dataset.

For an embodiment, the user data is generated based on sensing actions of a plurality of sub-users. For an embodiment, the action of the plurality of users includes actions of website visitors, and includes one or more of sensing or detection action of the sub-users.

For an embodiment, calculating the plurality of thresholds based on the size of the periodic user data includes determining the period and the sub-period. As previously described, for an embodiment, calculating the plurality of thresholds based on the size of the periodic user data includes calculating a volume of events of sub-user data based on an average of a last N sub-periods of event volume, and determining each of the plurality of thresholds based on the calculated volume of events, and previously determined minimum and maximum thresholds. As previously described, for at least some embodiment, the thresholds change based on patterns in the sub-users data and adapt to the average volume of events over time. For an embodiment, if the platform of the server 101 senses large volumes of events (sub-user data) come in, the server will adapt to react faster by lowering the threshold needed to trigger an alert. For an embodiment, if the platform of the server 101 senses lower volumes of events (sub-user data) over time, the platform automatically reacts to make the threshold needed larger, resulting in longer reaction times to reduce the chances of a false alarm. As previously described, the periods of the periodic user data may be one day, and the size of the periodic data may be one week. In this case, seven different thresholds may be detected to represent each day of the week.

Figure 2:
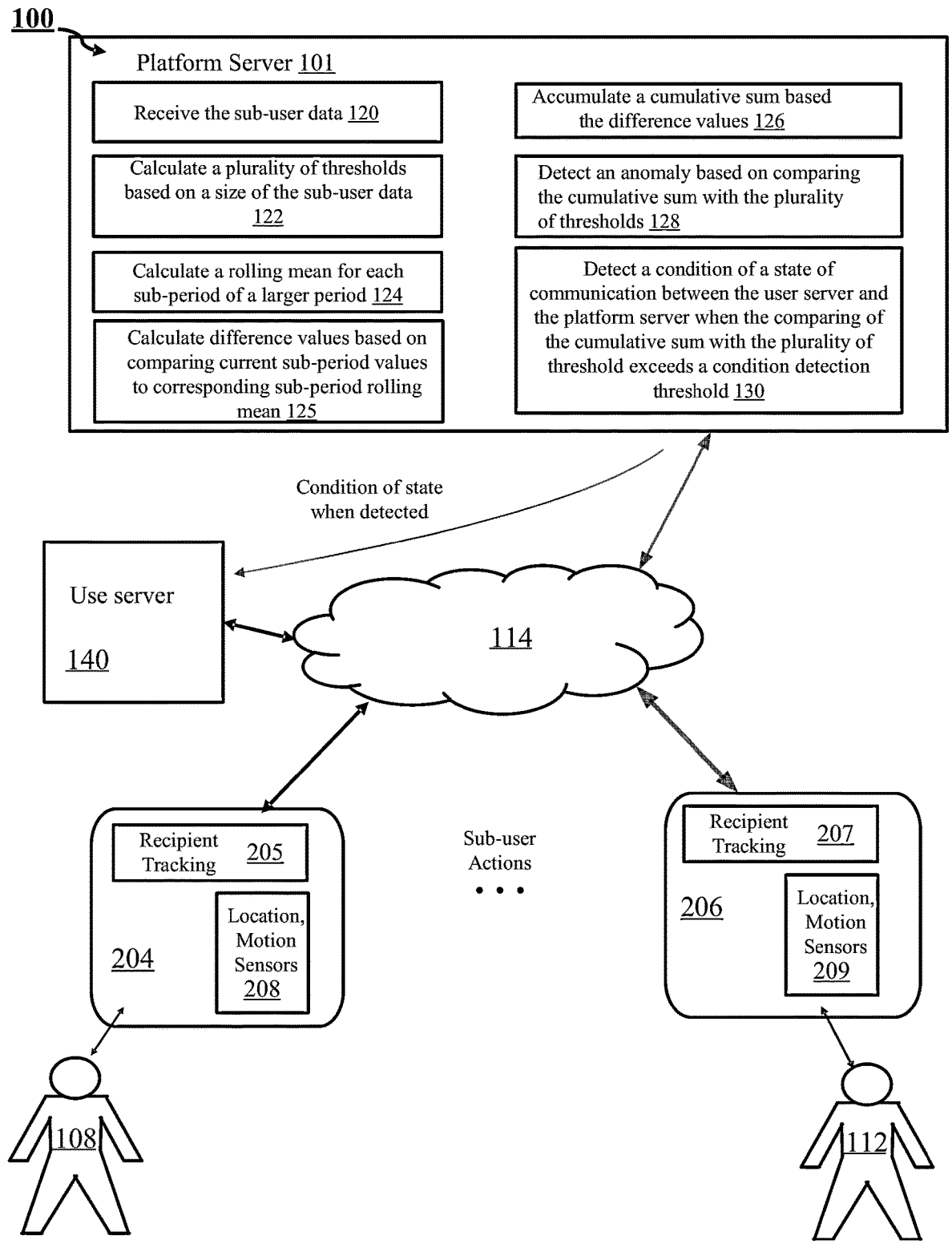
FIG. 2 shows another system for determining a condition of network communication between servers of a network by detecting changes in sub-user data, according to another embodiment.

FIG. 2 shows another system for determining a condition of network communication between servers of a network by detecting changes in sub-user data, according to another embodiment. For this embodiment, one or more sub-users generating the sub-user data are associated with a mobile device. Accordingly, actions and physical locations of the sub-users can be tracked. For at least some embodiments, the tracking of motions and/or locations of the sub-users are used for sensing sub-user actions of the sub-users.

As shown, recipients 108, 112 operate mobile devices 204, 206. For an embodiment, the mobile device 204, 206 includes location and/or motion detection sensor 208, 209, and/or recipient tracking sensors 205, 207. The location monitoring device may include a GNSS (global network satellite system), such as a GPS (global positioning system). Further the motion detection devices 208, 209 of the mobile devices 204, 206 may include accelerometers, gyroscopes, and/or magnetic sensors.

For this embodiment, one or more sub-users generating the sub-user data are associated with a mobile device. Accordingly, actions and physical locations of the sub-users can be tracked. For at least some embodiments, the tracking of motions and/or locations of the sub-users are used for sensing sub-user actions of the sub-users.

As shown, recipients 108, 112 operate mobile devices 204, 206. For an embodiment, the mobile device 204, 206 includes location and/or motion detection sensor 208, 209, and/or recipient tracking sensors 205, 207. The location monitoring device may include a GNSS (global network satellite system), such as a GPS (global positioning system). Further the motion detection devices of the mobile devices 204, 206 may include accelerometers, gyroscopes, and/or magnetic sensors.

For an embodiment, the location monitoring of the mobile device of the sub-user is used to identify business locations visited by the recipient after receiving the electronic messages. Different businesses can be rated, wherein particular businesses yield a higher sub-user action score, and other particular businesses yield a lower engagement score. The sub-user action score of each business can be adaptively adjusted based on the electronic messages of the user and can be adjusted based on other businesses visited by the recipient. For an embodiment, patterns of location visits by the recipient can be used to influence the level of sub-user action.

For an embodiment, motion of the recipient is tracked, and can be used to influence the level of sub-user action. Certain actions (motions) of the recipient may indicate different levels of sub-user action. For an embodiment, the computing devices 204, 206 may include a mobile phone, a smart watch, or a headset. Motion of the recipient can include tracking hand motions, direction of eyesight, and/or orientations of the recipient. Accordingly, whether the recipient is in a physical location of a product of the user can be determined. Further, how long the recipient holds or looks at a specific product of the user can be determined. Further, whether the recipient interacts with another recipient can be determined. All the sensed/tracked locations and motions of the sub-user can be included within a score of the sub-user action. Again, a score that exceeds a score threshold can be deemed a sub-user action.

Further, for an embodiment, different businesses physically visited can be rated, wherein particular businesses yield a higher success score and other particular businesses yield a lower success score. The success score of each business can be adaptively adjusted based on electronic messages and can be adjusted based on other businesses visited by the sub-user. For an embodiment, patterns of location visits by the sub-user can be used to influence the level of success. That is, for example, visiting a location of a business can be rated higher or lower based on a previous business visited by the sub-user.

As previously described, the sub-user tracking 205, 207 can include monitoring of web browsing of the sub-user. Online action and activity of the sub-user can influence the success score. Links accessed by the sub-user can be tracked. Websites visited by the sub-user can be tracked. Online purchases of the sub-user can be tracked. Each of the online web browsing of the sub-user can influence the success score of the sub-user actions.

For an embodiment, relationships between different sub-users are determined. For example, web tracking can determine online relationships between sub-users. Further, for an embodiment, a real physical relationship between sub-users can be established by tracking the locations of the different sub-users. Two sub-users may be identified as living together based on location tracking. Further, commonalities of recipients can be determined by identifying common locations, or common types of locations between the different sub-users. The influence one sub-user has on another sub-user can be measured and the influence can add or subtract from the success score.

For an embodiment, a level of sub-user action can be adaptively adjusted for each sub-user based on actions of an associated sub-user. An action by a related or common type of sub-user can influence how much an action by a sub-user influences the engagement determination or influences a success determination.

As previously described, the success determination of the described sub-user actions can be scored, and a score exceeding a score threshold and qualify as a sub-user action, wherein the sub-user actions are tracked and changes are identified.

Figure 3:
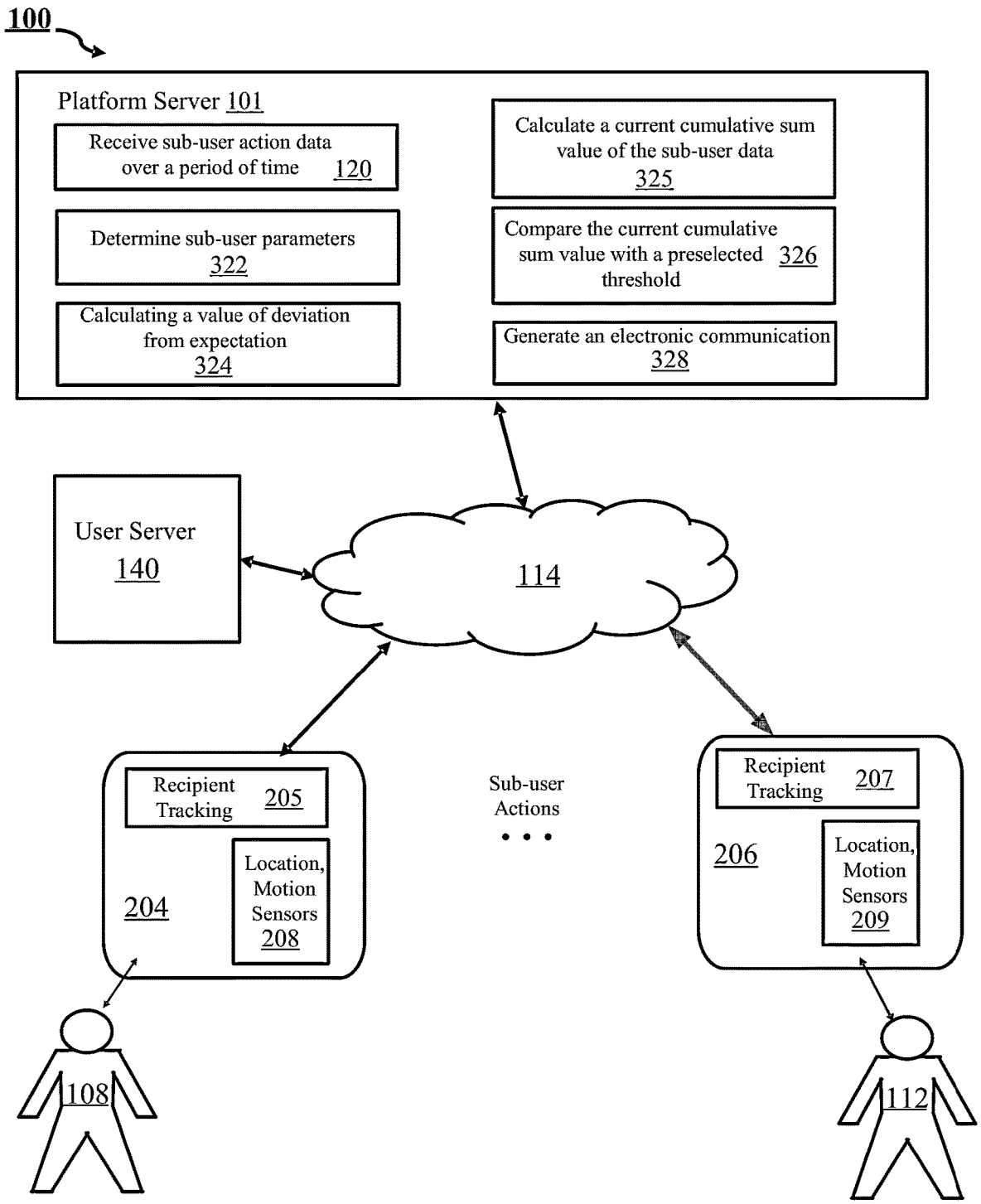
FIG. 3 shows a system for determining a condition of network communication between servers of a network by detecting changes in sub-user data, according to an embodiment.

FIG. 3 shows a system for determining a condition of network communication between servers of a network by detecting changes in sub-user data, according to an embodiment. For an embodiment, the platform server 101 operates (120) to receive the sub-user data from the user server 140 over a period of time. For an embodiment, the period of time is set or selected by the user server and could be done in real-time, or every 5 minutes, or every 30 minutes, or every hour and so on. For an embodiment, the period is selected based on a rate in which the sub-user data is sensed or provided.

For an embodiment, the platform server 101 further operates (322) to determine sub-user parameters including a mean, and a standard deviation of the sub-user data. For an embodiment, the includes the mean, and the standard deviation of counts of sub-user data over periods of time.

For an embodiment, the platform server 101 further operates (324) to calculate a value of deviation from expectation based at least on the mean, the standard deviation, and a noise factor.

For an embodiment, the platform server 101 further operates (325) to calculate a current cumulative sum value of the sub-user data based on a prior cumulative sum value and the value of the deviation from expectation. For an embodiment, the cumulative sum value includes a calculated value that indicates how much the sub-user data has deviated from an expected output. For an embodiment, the expected value is based on a historical/past mean (for an embodiment, the expected value is an exponentially weighted moving mean). When calculating an exponentially weighted moving mean all data is used but the data from more recent time periods is given more importance. In other words, more recent data has a greater impact on the mean.

For an embodiment, how surprising an observation (deviating from the expectation) is judged to be is determined by the expectation and the historical/past variability of the data (the standard deviation). For an embodiment, an exponentially weighted moving standard deviation is used in the calculations.

An observed value for any given time period often does not exactly match the expectation (previous mean). For an embodiment, this is considered normal. For an embodiment, in the calculation of the deviation from the expectation an absolute value for how much a given value deviates from the expectation is first calculated by subtracting the mean from the value. To judge how surprising (unexpected) this deviation is, the absolute deviation is divided by the standard deviation which measures the variability of the historical data. The logic in doing so is that data that varies a lot historically is likely to vary a lot going forward and deviation in such highly variable data should be considered less unexpected. The standard deviation is larger for highly variable data and when dividing by the higher number, a smaller deviation from expectation is obtained. Finally, a noise factor (also referred to as a modified noise factor for some embodiments) is also accounted for in the last step in the calculation of deviation from expectation. Because most processes are expected to produce values that differ from the expectation, a threshold can be used to control how large deviations should be considered normal, which is the role of the noise factor. By adding the noise factor to the deviation from expectation it is ensured that if a deviation from expectation is not smaller than the negative noise factor, the deviation from the expectation is zero or positive.

As previously stated, for an embodiment, the platform server 101 further operates (325) to calculate a current cumulative sum value of the sub-user data based on a prior cumulative sum value and the value of the deviation from expectation. For an embodiment, the platform server 101 further operates (326) to compare the current cumulative sum value with a preselected threshold.

Preselected Threshold (Deviation Threshold)

For an embodiment, the platform server 101 further operates (328) to generate an informative electronic communication for the user of the users server 140 when the current cumulative sum value satisfies a compared condition with the preselected threshold. For an embodiment, the informative electronic communication includes an alert. For an embodiment. the informative electronic communication includes an email notifying the user of the user server of the alert or it could be a UI (user interface) element (like a notification or a warning icon in the marketing automation platform). As will be described, for other embodiments the informative electronic communication is correlated with other activities of the user and the user server 140 to may have an effect or influence on the behavior (actions) of the sub-user of the user. For at least some embodiments, the change detection includes both negative and positive changes that can be correlated with action of the user.

For an embodiment, the platform server 101 further operates to detect a condition of a state of communication between the user server and the platform server when the current cumulative sum value satisfies a compared condition with the preselected threshold. For an embodiment, this indicates that the sub-user data has greatly changed which can be used as an indication that the sub-user data being provided to the platform server is no longer valid data. Accordingly, it is assumed that somehow the sensing, collecting, or communicating of the sub-user data broke. For an embodiment, the condition detection threshold is based on the plurality of thresholds, which for an embodiment, are determined through simulation and experimentation of historical and theoretical scenarios for which a sub-user's data had issues.

For an embodiment, the preselected threshold is selected based on an optimization process using data in which the desired output of the change detection system has been predetermined. For an embodiment, in the optimization process, different values of the preselected threshold are evaluated, and an optimized value is chosen based on how closely the output of the change detection process matched the desired output for that particular value of the preselected threshold.

It is to be noted that some of the described embodiments include a modified threshold. A modified threshold is a preselected threshold that has been modified based on a condition.

Sub-User Data Rate of Change Limit

For an embodiment, the platform server 101 further operates to detect a value change of the sub-user data and generate a revised representation of the sub-user data when the value change between the sub-user data and the previously determined mean, is detected to be greater than a change threshold. For an embodiment, the value change is a change in the value of the sub-user data over one or a few data points. It is desirable to limit the impact of such changes.

For an embodiment, the value change between the sub-user data and the previously determined mean is the difference in value between the current value of the sub-user data and the mean. For an embodiment, the sub-user data is aggregated by day (or another selected period of time) and compared against an exponentially weighted moving mean. Therefore, for this embodiment, the value change is the daily count of sub-user action events minus the exponentially weighted mean of all previous daily counts of the sub-user action events.

For an embodiment, the change threshold is determined based on previously calculated mean and standard deviation of the sub-user data, and an inertia threshold. For an embodiment, the inertia threshold is experimentally determined with different values and checking where the best performance in a manually labeled dataset is determined.

For an embodiment, the change threshold is determined based on previously calculated mean and standard deviation of the sub-user data, and an inertia threshold. For an embodiment, the inertia threshold is experimentally determined by experimenting with different values and checking where the best performance is obtained based on a manually labeled dataset. For an embodiment, the manually labeled dataset is a set of sequences of sub-user data over time that have been manually inspected and classified as to whether or not the sub-user data contain changes that warrant detection from the change detection system. For an embodiment, best performance means that many (greater than a threshold or ratio) of the changes manually labeled as warranting change detection were correctly detected by the change detection system, and that few (less than a threshold or ratio) sequences that were manually labeled as are not warranting change detection were marked as changes by the change detection system For an embodiment, the change threshold is determined using the previously calculated mean and standard deviation, and from a threshold factor (also referred to as the inertia-threshold). For an embodiment, the inertia-threshold is set as a constant factor but since the mean and standard deviation are changing the resulting threshold is adaptable. The threshold factor varies across the input data (sensed sub-user data) as the mean and standard deviations vary. For an embodiment, the inertia-threshold is set by experimenting with different values and checking where the best performance on the manually labeled dataset is obtained.

For an embodiment, the revised representation of the sub-user data is adaptively determined based on previously calculated mean and standard deviation of the sub-user data, an increase factor, and the inertia threshold. For an embodiment, the revised representation is determined using both the mean and standard deviation as well as a constant that is referred to as the increase-factor, and the previously mentioned inertia-threshold. The fact that the mean and standard deviations change means that the value of the revised representation is set adaptively. For an embodiment, the increase-factor is experimentally set by setting it to different values and checking for the best performance on the manually labeled dataset.

Modification of Deviation from Expectation by Limiting Values of the Standard Deviation For an embodiment, the platform server 101 further operates to generate a normalization value based on the standard deviation when the standard deviation is detected to be less than a deviation threshold (for an embodiment, the deviation threshold is the preselected threshold or the modified threshold). Further, calculating, by the platform server, the value of deviation from expectation is based at least on the mean, the normalization value, and the noise factor.

Normalization Value

When attempting to detect output changes of a data generating process that could indicate changes in the process itself, it is often desirable to know how large a given change in a value is compared to how much the value is expected to deviate. An easy way to achieve this is to divide the value change by a normalization value such as the standard deviation of the value. For an embodiment, the normalization value serves to transform the deviation into a format that quantifies how large the deviation is compared to expected deviation. For an embodiment, the standard deviation is calculated from previously seen observations of the value. For an embodiment, the standard deviation is pre-known if the process generating the data is well understood. For at least some embodiments, other normalization values than the standard deviation are selected or used.

Noise Factor

A noise factor is used to dictate to the change detection system how large a deviation from the historical mean is considered indicative of a change in the data generating process. Deviation larger than the bounds dictated by the noise factor will start to accumulate in the cumulative sum value. Noise factors can be optimized in an optimization process such as has been described previously. As will be described, for at least some embodiments, the noise factor is updated with a modified noise factor.

As previously described, for an embodiment, the noise factor (also referred to as a modified noise factor for some embodiments) is also accounted for in the last step in the calculation of deviation from expectation. Because most processes are expected to produce values that differ from the expectation, a threshold can be used to control how large deviations should be considered normal, which is the role of the noise factor. By adding the noise factor to the deviation from expectation it is ensured that if a deviation from expectation is not smaller than the negative noise factor, the deviation from the expectation is zero or positive.

For an embodiment, calculating the deviation from expectation includes a division by the standard deviation. Therefore, the expectation can become very large when the standard deviation becomes small. This in turn affects the change detection performance negatively. Therefore, limiting the value of the standard deviation makes the cumulative sum value methods for detecting changes in sub-user behavior more stable on data with low natural variability.

Deviation Threshold (Preselected Threshold)

The cumulative sum value quantifies how far the output of a process has deviated from the expectation. The deviation threshold or the preselected threshold (or for some embodiments, the modified threshold) is the final limit used to dictate how high or low the cumulative sum value can reach before the system should indicate that a change has occurred in the data generating process. The cumulative sum value is simply compared to the deviation threshold and the outcome of that comparison, usually whether the cumulative sum value is higher or lower than the deviation threshold, dictates the output of the change detection system as a whole.

For an embodiment, the deviation threshold is determined by experimentally observing results on a manually labeled dataset for different values of the deviation threshold. For an embodiment, the deviation threshold is determined by experimenting with different values and checking for the best performance on a manual labeled dataset. For an embodiment, the deviation threshold is experimentally determined by experimenting with different values and checking where the best performance is obtained based on the manually labeled dataset. For an embodiment, the manually labeled dataset is a set of sequences of sub-user data over time that have been manually inspected and classified as to whether or not the sub-user data contain changes that warrant detection from the change detection system. For an embodiment, best performance means that many (greater than a threshold or ratio) of the changes manually labeled as warranting change detection were correctly detected by the change detection system, and that few (less than a threshold or ratio) sequences that were manually labeled as are not warranting change detection were marked as changes by the change detection system.

An embodiment includes an optimization process for determining one or more of the deviation thresholds, a minimum value of the normalization value, the noise factor, and/or the inertia threshold. For an embodiment, the optimization process includes using data where the desired output of a change detection system has been determined. In the optimization process different values are tried for one or more values of the parameters under optimization. Optimized values are determined by checking for which values of the optimization parameters the output of the change detection process most closely match the desired output. For an embodiment, most closely is within a threshold amount.

For an embodiment, the optimization parameters are determined using an optimization process. For an embodiment, the optimization process includes studying all data and for each data sequence assigning a manual label showing whether it is desirable that the system detected a change for the sequence in question. Secondly the change detection system is performed with a set of different values for the parameter being optimized. By looking at which data is correctly labeled according to the earlier definition of whether or not the system should have detected a change or not, it is possible to find values of the parameter in question that leads to good system performance. Good system performance means that there were few cases where the change detection system did not detect a change where the manual labeling indicated change detection was desirable, and few cases where the change detection system did detect a change where the manual labeling indicated that change detection was not desirable. For an embodiment, the few cases are less than a threshold value of cases in which the change detection system does or does not detect changes that the manual labeling indicates are different. As previously stated, for an embodiment, parameters that go through this optimization process include the deviation threshold, a minimum value of the normalization value, the noise factor, and the inertia threshold, or any combination of these.

Modified Noise Factor

For an embodiment, the platform server 101 further operates to determine a modified noise factor based on the value of the sub-user data, to make the change detection system more sensitive to certain values and calculating the value of deviation from expectation based at least on the mean, the standard deviation, and the modified noise factor. For an embodiment, the modified noise factor controls how sensitive the change detection system is to changes in the sub-user data.

For an embodiment, the modified noise factor is selected to make the change detection system more sensitive to situations that are likely to indicate that a change has occurred. For an embodiment, the modified noise factor is selected to make the change detection system less sensitive to situations that are unlikely to indicate that a change has occurred. For an embodiment, the modified noise factor is selected based on an observed value. For an embodiment, the modified noise factor is selected to be a small value (less than a threshold value), thereby making the change detection system sensitive when the observed value is zero.

For an embodiment, the noise factor (modified noise factor) is used in the last step in the calculation of deviation from expectation. Because most processes are expected to produce values that differ from the expectation, a threshold can be used to control how large deviations should be considered normal. This is the role of the noise factor (or modified noise factor). By adding the noise factor in the calculation of the deviation from expectation, differences of sub-user data and historical mean that are small in relation to the normalization value will lead to a deviation from expectation value that is either 0 or positive. Only large negative deviations will lead to a negative deviation from expectation that accumulates in the cumulative sum value.

It is to be understood that the described embodiment can be applied to detect both positive and negative dips in the sub-user data. For an embodiment, the noise factor is experimented with and set to a value that causes the processing to accumulate the cumulative sum value when there are large positive deviations.

Modified Threshold (Modified Preselected Threshold or Modified Deviation Threshold)

For an embodiment, the platform server 101 further operates to select a modified threshold based on a set time period value of the sub-user data. For an embodiment, the set time period value includes a daily value. For an embodiment, the platform server 101 further operates to generate the informative electronic communication for the user server when the current cumulative sum value is greater than the modified threshold.

For an embodiment, the modified threshold is a modification of the preselected or deviation thresholds. For an embodiment, more than one threshold or multiple thresholds are selected, and a different threshold is used depending on the observed value.

For an embodiment, breaks in a series of time samples of the sub-user data represented by zero values, are much more likely to indicate an integration problem than other daily (periodic) counts. Therefore, for an embodiment, the change detection method is more sensitive to these zero values. The threshold value is one parameter that controls the sensitivity of the change detection system. By using a different threshold for cases where the observed value is zero (0), the change detection system can be made more sensitive for these cases. For an embodiment, the threshold values used are determined by observing the data, experimenting with different threshold values and determining which threshold values provide the best performance.

Action Performed Upon Detecting Change

For an embodiment, upon detecting the change, an alert is electronically sent to the operator of the user server. For at least some embodiment, the informative electronic communication includes one or more of an alert to the user of a possible problem or an alert internal staff to troubleshoot the problem. Further actions can include automatically working to resolve the problem or stopping dependent processes that might be adversely affected by the problem. For an embodiment, the informative electronic communication includes an email notifying the user server of the alert or it could be a UI element (like a notification or a warning icon in the marketing automation platform). For an embodiment, the platform server 101 may direct and automatic update of the website to operate as the website did before the condition was detected. For example, if the website is controlled by a version 1.12 after the condition was detected but controlled by version 1.11 before the condition was detected, the platform server 101 may automatically direct and update the website back to version 1.11 (a previous version in which no problems were detected).

Correlating the Sensed Change in the Sub-User Data

For an embodiment, the platform server 101 further operates to correlate the informative electronic communication with an action of the user server. As previously described, for an embodiment the informative electronic communication includes an alert that is provided to the user server 140. The alert lets a user who operates the user server 140 know that a change in the sensed sub-user data has been sensed. As previously described, the operator of the user server 140 may have performed an action that broke the integration of the user server 140 with the platform server 101. The informative electronic communication can be correlated to the action of the operator of the user server 140 to inform the operator of the user server 140 that the action may have broken the integration. That is, as previously described, the way in which integrations or parts of integrations are set up can be fragile. For example, this may be the case when operator of the user server 140 installs their own code snippets, that send over data to the platform of the server 101, directly on their websites. In such cases, the operator of the user server 140 could accidentally disrupt or break their code snippets when making routine updates or changes to their website. An example would be if an operator of the user server 140 accidentally deletes the closing bracket of an installed code snippet. To the user operator of the user server 140 it might look like everything should be working because most of the code is still there, but the data the snippet was meant to send likely stops being transferred to the marketing automation platform of the server 101. This means that a platform of the server 101 functionality dependent on that particular data stops working. For an embodiment, the platform server 101 may direct and automatically update the website to operate as the website did before the condition was detected. For example, if the website is controlled by a version 1.12 after the condition was detected but controlled by version 1.11 before the condition was detected, the platform server 101 may automatically direct an updating of the website back to version 1.11 (a previous version in which no problems were detected).

It is to be understood that the detected change in the sub-user data can be correlated with many other different possible actions by the platform server 101 or the user server 140. For example, for at least some embodiments the server operates to manage electronic messages of the operator of the user server 140. The electronic messages can include marketing through the distribution of the electronic messages to, for example, sub-users 108, 112 of the user. For an embodiment, detected changes in the sub-user data can be correlated to changes in the electronic messages. For example, new electronic messages may be initiated. Changes in the sub-user data can be correlated with the initiation of a new set of electronic messages, or the retirement of a prior set of electronic messages. Further, the changes in the sub-user data can be correlated changes in the sub-user list of the electronic messages. Further, the changes in the sub-user data can be correlated changes in a platform of the electronic messages. Users constantly try to improve their processes for sending out electronic messages by way of electronic messages to sub-users or potential sub-users. The described embodiment for detecting changes in sub-user activity can sense changes in sub-user behavior that can be correlated with changes in the processes of users generating electronic messages. The correlated changes can be used by users to identify changes that either greatly help or severely hurt the sub-user experience. Accordingly, the correlations between sub-user action changes can be used by the user to automatically eliminate changes that hurt (decreased) sub-user actions, and the automatically include changes that help (increase) sub-user actions.

At least some embodiments further include the platform server 101 automatically performing an action upon detecting a correlation with a change in the electronic message and the detected change in the sub-user data. Such action can include maintaining a change in the electronic messages that greatly improves the electronic messages, and eliminating changes in the electronic messages that greatly hurts the electronic messages.

FIG. 4 is a table that shows sub-user actions, according to an embodiment. The table shows days, and the number of sub-user actions (viewed product events) for each of the days. Here, the viewed product events are counted over a daily period. The data of the table is then analyzed to detect or identify changes in sub-user behavior. Such detected changes in sub-user behavior can then be correlated with an action or event.

Figure 5:
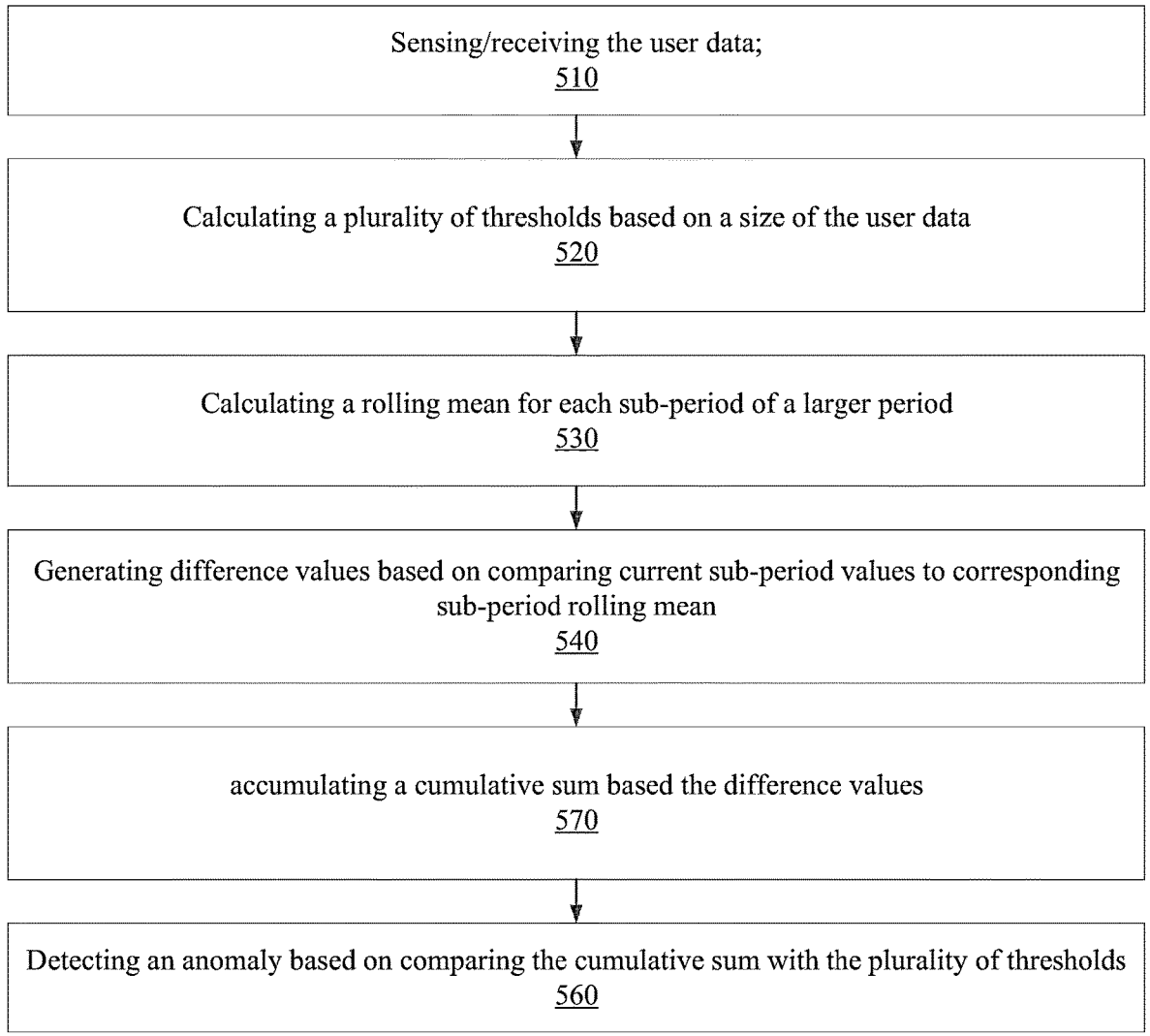
FIG. 5 is a flow chart that includes steps of a method for determining a condition of network communication between servers by detecting changes in sub-user data, according to an embodiment.

FIG. 5 is a flow chart that includes steps of a method for determining a condition of network communication between servers by detecting changes in sub-user data, according to an embodiment. A first step 510 includes sensing/receiving the periodic user data. A second step 520 includes calculating a plurality of thresholds based on a size of the periodic user data. A third step 530 includes calculating a rolling mean for each sub-period of a larger period. A fourth step 540 includes generating difference values based on comparing current sub-period values to corresponding sub-period rolling mean. A fifth step 550 includes accumulating a cumulative sum based on the difference values. A sixth step 560 includes detecting an anomaly based on comparing the cumulative sum with the plurality of thresholds. An embodiment further includes detecting, by the platform server, a condition of a state of communication between the user server and the platform server when the comparing of the cumulative sum with the plurality of threshold exceeds a condition detection threshold, and feeding, by the platform server, the condition of the state of communication back to the user server when the condition is detected. For an embodiment, this indicates that the sub-user data has greatly changed which can be used as an indication that the sub-user data being provided to the platform server is no longer valid data. Accordingly, it is assumed that somehow the sensing, collecting, or communicating of the sub-user data broke.

For an embodiment, the sub-periods are days of the week, and the larger period is a week. For this embodiment, the system is set up to automatically detect the weekly patterns in data, while also handling stable data, without the need for user input.

For an embodiment, the platform server provides an alert to the user when an anomaly is detected. For an embodiment, users receive a notification of a detected anomaly via email or to their phone via SMS (short message service). For an embodiment, the anomaly can be correlated with recently made actions by the user in order to provide context on how to fix the issue that caused the existence of the anomaly. The recently made actions of the user or an operator of the user server may include the previously described accidental disruption or breaking of code snippets when making routine updates or changes to their website. For an embodiment, the platform server provides a record to the user of when the data was last received by the server so that the user can more readily determine where the issue occurred upstream or within their account.

It is to be understood that for at least some embodiments, the issue or problem could come from something external to the platform server. For example, a metric that was measuring whether a sub-user made a purchase with a gift card, a sensor that was counting how many packages were shipped to a warehouse, or people physically checking in to a workout class. In these cases, after an anomaly is detected by the platform server, the user can go into their account and be guided through taking actions to resolve the issue.

An embodiment further includes adapting the plurality of thresholds based on known holidays that could have an impact on levels of incoming metrics. For example, certain businesses may be closed on a national holiday. An embodiment includes automatically adjusting the thresholds during these times of the year to adapt to known drops in data based on the type of data being received by the server.

For an embodiment, feeding the condition of the state back to the user server includes providing a communication update to a user of the user server indicating failure of communication of the sub-user data between the user server and the platform server. For an embodiment, feeding the condition back to the user server includes controlling an update of a website of the user. For an embodiment, controlling the update of the website includes automatically updating the website to a version implemented before the detection of the condition. That is, to the update version before the update version that caused the condition to be detected. For example, if a failure of the communication between the user server and the platform server is detected for version 3.11 of the website, then the website can be updated with version 3.10 which is a version used before the detection of the condition.

At least some embodiments further include the platform server being configured to detect a sub-condition of the state of communication between the user server and the platform server when the comparing of the cumulative sum with the plurality of threshold is compared with a sub-condition detection threshold, wherein the sub-condition detection threshold is different than the condition detection threshold. Here, the condition is not detected, so the connection between the user server and the platform server is assumed to be fine. However, the processing may be used to detect other changes that may have occurred which have caused a detected change in the periodic sub-user data. For an embodiment, the sub-condition detection threshold is greater than the condition detection threshold. For an embodiment, the sub-condition detection threshold is less than the condition detection threshold. For an embodiment, the platform server is further configured to correlate the detection of the sub-condition with an activity of the user of the user-server. The activity of the user may include a new (or a change in) electronic messages sent to sub-users, a change in recipients of the electronic messages, a change in send times of the electronic messages.

For an embodiment, the platform server is further configured to receive the sub-user data over a period of time, determine sub-user parameters including a mean, and a standard deviation of the sub-user data, determine a modified noise factor based on a value of the sub-user data to make change detection more sensitive to certain values, calculate a value of deviation from expectation based at least on the mean, the standard deviation, and the modified noise factor, calculate a current cumulative sum value of the user data based on a prior cumulative sum value and the value of the deviation from expectation, compare the current cumulative sum value with a preselected threshold, detect the condition of the state of communication between the user server and the platform server when the current cumulative sum value satisfies a compared condition with the preselected threshold, and feed the condition of the state of communication back to the user server when the condition is detected. For an embodiment, the platform server is further configured to generate a normalization value when the standard deviation is detected to be less than a deviation threshold, wherein calculating the value of deviation from expectation is based at least on the mean, the normalization value, and the modified noise factor. For an embodiment, the deviation threshold is determined by experimentally observing results on a manually labeled dataset for different values of the deviation threshold. For an embodiment, the modified noise factor is used in a last step in calculation of a deviation from expectation, and wherein when the sub-user data and a historical mean are less than a preselected fraction of the normalization value, then the sub-user data and the historical mean provide a deviation from expectation value that is either zero or positive. For an embodiment, the modified noise factor controls how sensitive the change detection system is to changes in the sub-user data.

For an embodiment, the platform server is further configured to receive the sub-user data over a period of time, determine sub-user parameters including a mean, and a standard deviation of the sub-user data, generate a normalization value based on the standard deviation when the standard deviation is detected to be less than a deviation threshold, calculate a value of deviation from expectation based at least on the mean, the normalization value, and a noise factor, calculate a current cumulative sum value of the sub-user data based on a prior cumulative sum value and the value of the deviation from expectation, compare the current cumulative sum value with a preselected threshold, detect a condition of a state of communication between the user server and the platform server when the current cumulative sum value satisfies a compared condition with the preselected threshold, and feed the condition of the state of communication back to the user server when the condition is detected. For an embodiment, the platform server is further configured to detect a value change of the sub-user data, and generate a revised representation of the sub-user data when the value change between the sub-user data and the previous determined mean, is detected to be greater than a change threshold, wherein the sub-user parameters including a mean, and a standard deviation of the revised representation sub-user data. For an embodiment, the revised representation of the sub-user data is lower. For an embodiment, the platform server is further configured to determine the change threshold based on previously calculated mean and standard deviation of the sub-user data, and an inertia threshold, wherein the inertia threshold is experimentally determined by checking various values of the inertia threshold and determining a performance based on a manually labeled dataset. For an embodiment, the revised representation of the sub-user data is adaptively determined based on previously calculated mean and standard deviation of the sub-user data, an increase factor, and an inertia threshold, wherein the increase factor is experimentally determined by checking various values of the increase factor and determining a performance with a manually labeled dataset.

As previously described, for an embodiment, the sub-user data is generated based on sensing actions of a plurality of sub-users. For an embodiment, the action of the plurality of sub-users includes actions of website visitors and includes one or more of an online activity or offline activity of the sub-users, including sensed physical motion or activities of the sub-users.

As previously described, for an embodiment, calculating the plurality of thresholds based on the size of the periodic user data includes determining the period and the sub-period. As previously described, for an embodiment, calculating the plurality of thresholds based on the size of the periodic user data includes calculating a volume of events of sub-user data based on an average of a last N sub-periods of event volume, and determining each of the plurality of thresholds based on the calculated volume of events, and previously determined minimum and maximum thresholds. As previously described, for at least some embodiment, the thresholds change based on patterns in the sub-user data and adapt to the average volume of events over time.

Figure 6:
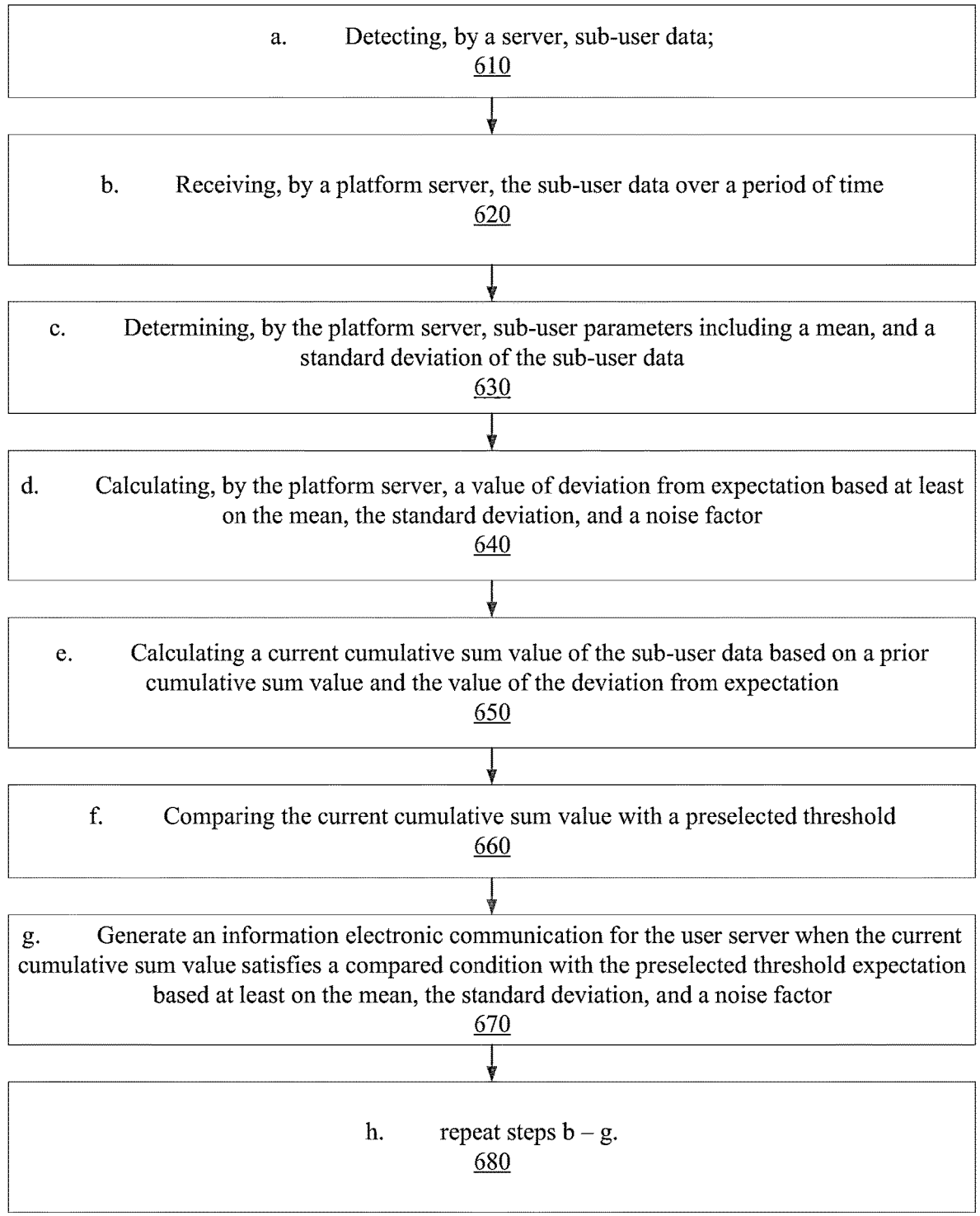
FIG. 6 is a flow chart that includes steps of another method for determining a condition of a network by detecting changes in sub-user data, according to an embodiment.

FIG. 6 is a flow chart that includes steps of another method for determining a condition of a network by detecting changes in sub-user data, according to an embodiment. A first step 610 includes a. detecting, by a user server, sub-user data. A second step 620 includes b. receiving, by a marketing platform server, the sub-user data over a period of time. A third step 630 includes c. determining, by the marketing platform server, sub-user parameters including a mean, and a standard deviation of the sub-user data. A fourth step 640 includes d. calculating, by the marketing platform server, a value of deviation from expectation based at least on the mean, the standard deviation, and a noise factor. A fifth step 650 includes e. calculating a current cumulative sum value of the sub-user data based on a prior cumulative sum value and the value of the deviation from expectation. A sixth step 660 includes f. comparing the current cumulative sum value with a preselected threshold. A seventh step 670 includes g. generating an informative electronic communication for the user server when the current cumulative sum value satisfies a compared condition with the preselected threshold, thereby indicating a determined condition of a network. An eighth step 680 includes h. repeating steps b-g.

For an embodiment, the platform server 101 further operates to detect a condition of a state of communication between the user server and the platform server when the current cumulative sum value satisfies a compared condition with the preselected threshold. For an embodiment, this indicates that the sub-user data has greatly changed which can be used as an indication that the sub-user data being provided to the platform server is no longer valid data. Accordingly, it is assumed that somehow the sensing, collecting, or communicating of the sub-user data broke.

Figure 7:
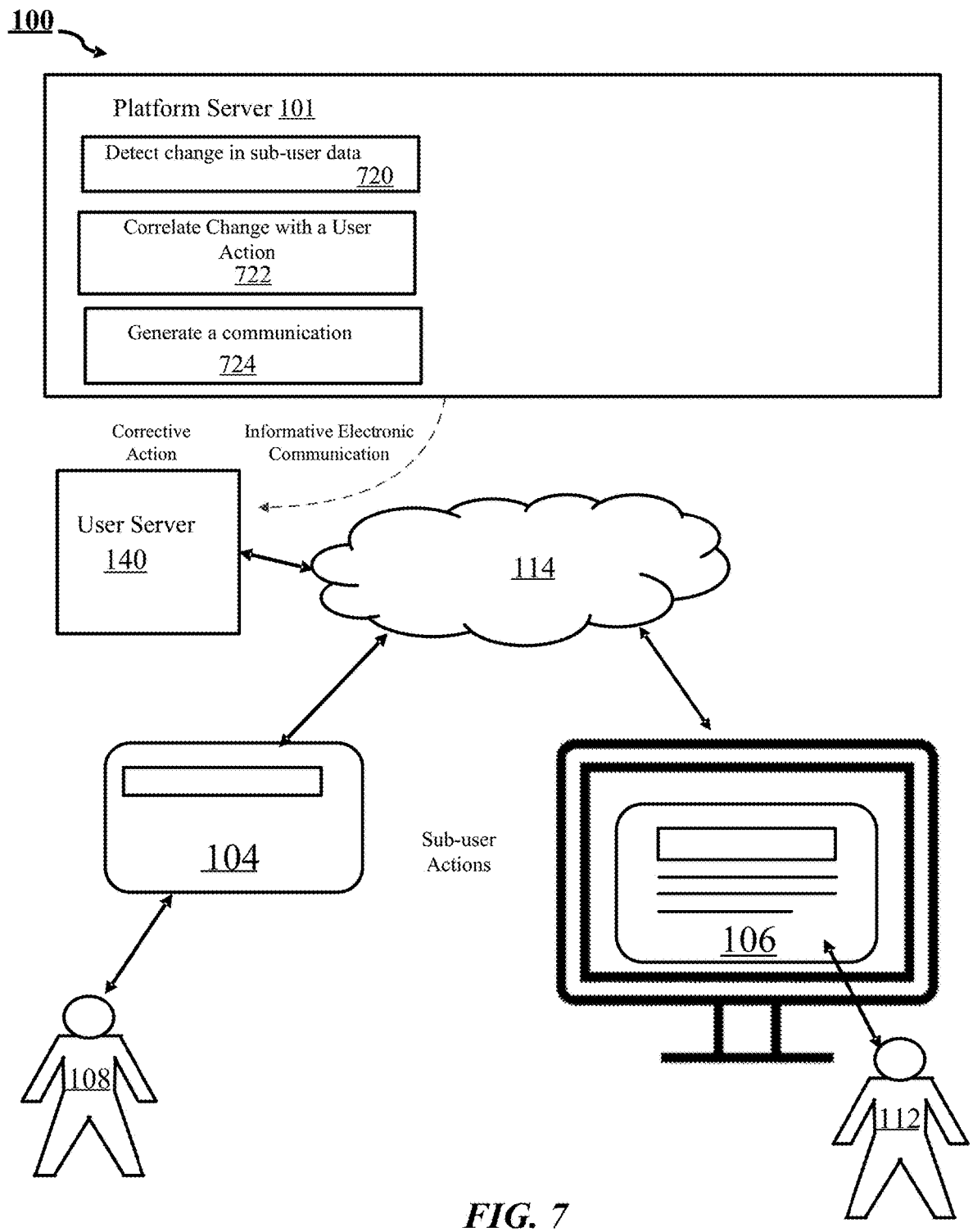
FIG. 7 shows a system for detecting changes in sub-user data of a user, correlating the detected change with an action, and providing a corrective action, according to an embodiment.

FIG. 7 shows a system for detecting changes in sub-user behavior of a user, correlating the detected change with an action, and providing a corrective action, according to an embodiment. That is, the described embodiments can be used for detecting changes in the sub-user action 720. Once the change in the sub-user behavior has been detected, the change can be correlated with an action by the user 722. Such action can include changes the user made in the integration of the sensing of sub-user data with the platform of the platform server 101. For an embodiment, an electronic communication 724 (such as an alert) is provided to the operator of the user server 140 upon detection of the change in the sub-user actions.

As previously stated, for at least some embodiments, the informative electronic communication is correlated with one or more events or activities of the user. For an embodiment, an electronic messaging action of the user is correlated with an action of the operator of the users server 140 that broke the integration of the user server 140 with the user 101 (platform server). The informative electronic communication can be correlated to the action of the operator of the user server 140 to inform the operator of the user server 140 that the action may have broken the integration.

For an embodiment, the informative electronic communication is correlated with many other different possible actions by the platform server 101 or the user server 140. For example, for at least some embodiments the platform server 101 operates to manage electronic messages of the operator of the user server 140. The electronic messages can include marketing through the distribution of electronic messages to, for example, sub-users of the user. For an embodiment, detected changes in the sub-user data can be correlated to changes in the electronic messages. For example, a new set of electronic messages may be initiated. Changes in the sub-user data can be correlated with the initiation of a new set of electronic messages, or the retirement of a prior set of electronic messages. Further, the changes in the sub-user data can be correlated changes in the sub-user list of the electronic messages. Further, the changes in the sub-user data can be correlated changes in the platform of the electronic messages. Users constantly try to improve their processes for sending out electronic messages to sub-users or potential sub-users. The described embodiment for detecting changes in sub-user activity can sense changes in sub-user behavior that can be correlated with changes in the processes of users generating electronic messages. The correlated changes can be used by users to identify changes that either greatly help or severely hurt the sub-user experience. Accordingly, the correlations between sub-user action changes can be used by the user to automatically eliminate changes that hurt (decreased) sub-user actions and automatically include changes that help (increase) sub-user actions. For example, a new electronic message or new sub-user list of electronic messages may be really good or really bad and generates the informative electronic message due to a large (detected) change in sub-user actions. Accordingly, a good set of electronic messages or updated sub-user lists can be maintained. Further, a new set of electronic messages or sub-user list that generates a detected (drop) in sub-user actions may be suspended.

At least some embodiments further include the platform of the server 101 automatically performing an action upon detecting a correlation with a change in the electronic messages and the detected change in the sub-user data. Such action can include, maintaining a change in the electronic messages that greatly improves the electronic messages, and eliminating changes in the electronic messages the greatly hurts the performance of the electronic messages.

Figure 8:
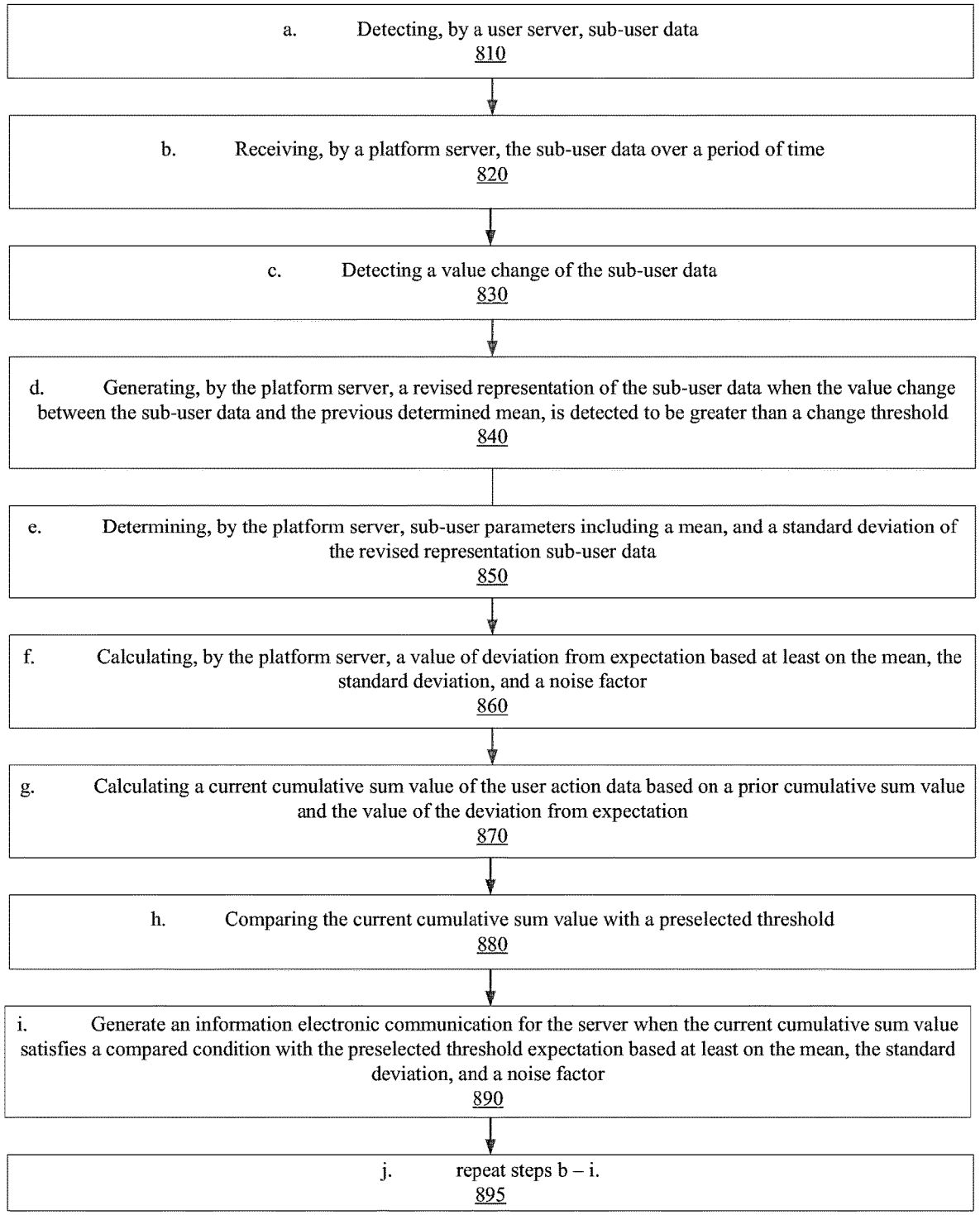
FIG. 8 is a flow chart that includes steps of a method for determining a condition of a network by detecting changes in sub-user data, according to another embodiment.

FIG. 8 is a flow chart that includes steps of a method for determining a condition of a network by detecting changes in sub-user data, according to another embodiment. A first step 810 includes a. detecting, by a user server, sub-user data. A second step 820 includes b. receiving, by a marketing platform server, the sub-user data over a period of time. A third step 830 includes c. detecting a value change of the sub-user data. A fourth step 840 includes d. generating, by the marketing platform server, a revised representation of the sub-user data when the value change between the sub-user data and the previous determined mean, is detected to be greater than a change threshold. A fifth step 850 includes determining, by the platform server, sub-user parameters including a mean, and a standard deviation of the revised representation sub-user data. A sixth step 860 includes f. calculating, by the platform server, a value of deviation from expectation based at least on the mean, the standard deviation, and a noise factor. A seventh step 870 includes g. calculating a current cumulative sum value of the sub-user data based on a prior cumulative sum value and the value of the deviation from expectation. An eighth step 880 includes h. comparing the current cumulative sum value with a preselected threshold. A ninth step 890 includes i. generating an informative electronic communication for the user server when the current cumulative sum value satisfies a compared condition with the preselected threshold, thereby indicating a determined condition of a network. A tenth step 895 includes j. repeating steps b-i.

For an embodiment, the platform server 101 further operates to detect a condition of a state of communication between the user server and the platform server when the current cumulative sum value satisfies a compared condition with the preselected threshold. For an embodiment, this indicates that the sub-user has greatly changed which can be used as an indication that the sub-user data being provided to the platform server is no longer valid data. Accordingly, it is assumed that somehow the sensing, collecting, or communicating of the sub-user data broke.

For an embodiment, the value change is a change in the value of the sub-user data over one or a few data points. It is desirable to limit the impact of such changes.

As previously described, for an embodiment, the value change between the sub-user data and the previously determined mean is simply the difference in value between the current value of the sub-user data and the mean. For an embodiment, the sub-user data is aggregated by day and compared against an exponentially weighted moving mean. Therefore, for this embodiment, the value change is the daily count of sub-user action events minus the exponentially weighted mean of all previous daily counts of the sub-user action events.

The revised representation exactly matches the sub-user data when the values of the sub-user data are lower than, or close to, the moving mean (the mean is not plotted in the graph). When the sub-user data values are much higher than the moving mean, the revised representation takes on values that are lower than those of the sub-user data.

As previously described, for an embodiment, the revised representation of the sub-user data operates to limit the impact of large positive outliers. Without correction, positive outliers skew the means and standard deviations creating scenarios in which the informative electronic communication, such as, an alarm might never trigger on valid anomalies. For an embodiment, the revised representation of the sub-user data is lower or equal to the sub-user data.

As previously described, for an embodiment, the change threshold is determined based on previously calculated mean and standard deviation of the sub-user data, and an inertia threshold. For an embodiment, the inertia threshold is experimentally determined with different values that are checked by determining the best performance in a manually labeled dataset.

As previously described, for an embodiment, the threshold is determined using the previously calculated mean and standard deviation, and also from a threshold factor (also referred to as the inertia threshold). For an embodiment, the inertia-threshold (inertia threshold) is set as a constant factor but since the mean and standard deviation are changing the resulting threshold is adaptable. The threshold factor varies across the input data (sensed sub-user data) as the mean and standard deviations vary. For an embodiment, the inertia-threshold is set by experimenting with different values and checking where the best performance on the manually labeled dataset.

Figure 9:
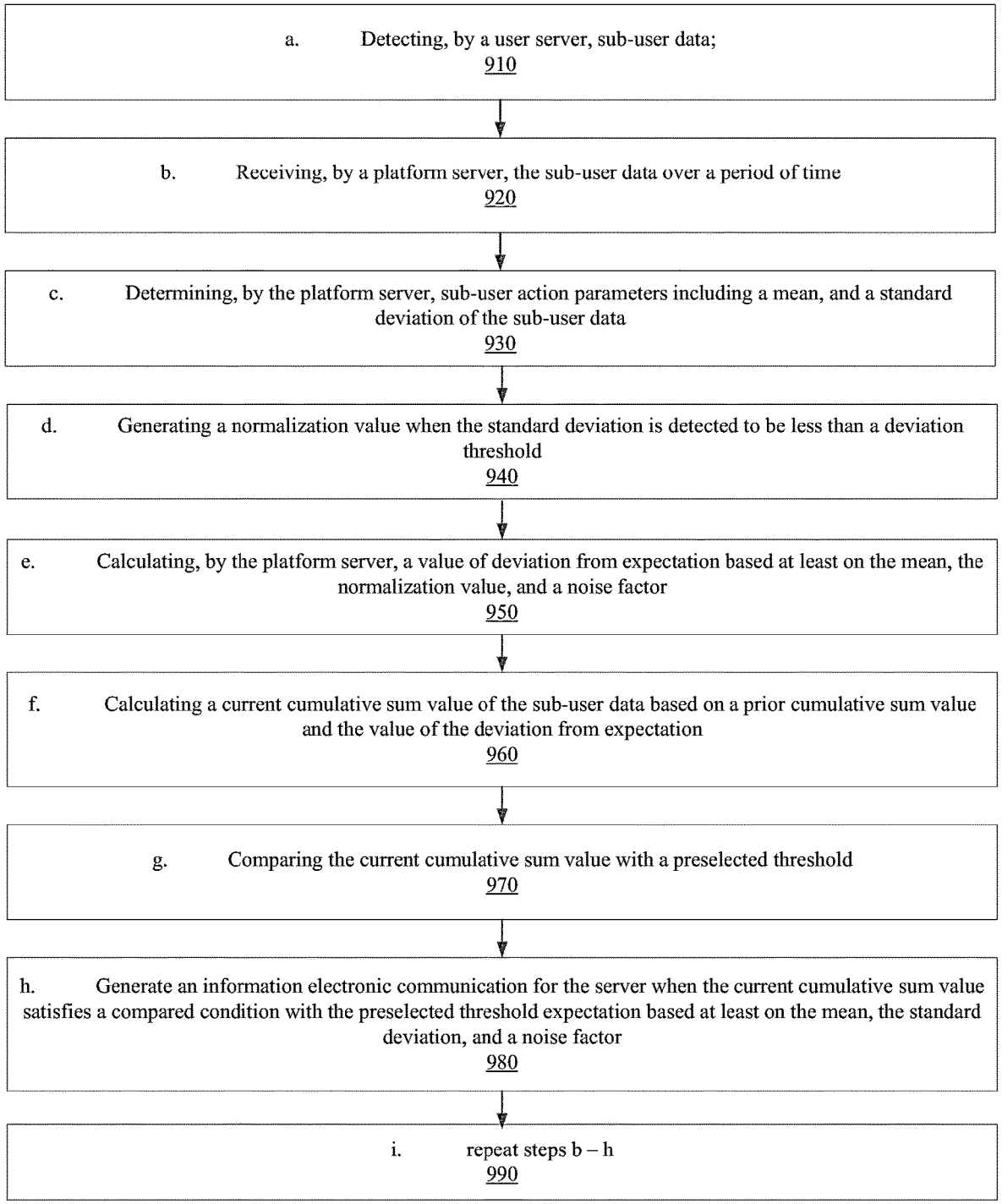
FIG. 9 is a flow chart that includes steps of a method for determining a condition of a network by detecting changes in sub-user data, according to another embodiment.

For an embodiment, the best or ideal performance occurs when the change detection system detects a change for all the cases in which manual labeling indicates that change detection was desirable, and never detects a change when the manual labeling indicates that change detection was not desirable. For an embodiment, to measure the performance of the change detection system, a number of true positive and false positive cases detected by the system is computed. For an embodiment, the true positive cases are cases wherein the change detection system detects a change where the manual labeling indicates that change detection was desirable. For an embodiment, false positive cases are cases wherein the change detection system detects a change where the manual labeling indicated that change detection was not desirable. Ideally, the change detection system has zero false positives and the same number of true positives as the number of manually labeled anomalies. However, this is rarely achieved in practice and there is almost always a tradeoff between the two measurements. For an embodiment, optimizing performance the change detection system includes a maximum number of true positive cases while keeping the false positive cases as low as possible. As previously described, for an embodiment, the inertia threshold is experimentally determined by experimenting with different values and checking where the best performance is obtained based on a manually labeled dataset. For an embodiment, the manually labeled dataset is a set of sequences of sub-user data over time that have been manually inspected and classified as to whether or not the sub-user data contain changes that warrant detection from the change detection system. For an embodiment, best performance means that many (greater than a threshold or ratio) of the changes manually labeled as warranting change detection were correctly detected by the change detection system, and that few (less than a threshold or ratio) sequences that were manually labeled as are not warranting change detection were marked as changes by the change detection system As previously described, for an embodiment, the revised representation of the sub-user data is adaptively determined based on previously calculated mean and standard deviation of the sub-user data, an increase factor, and an inertia threshold. For an embodiment, the revised representation is determined using both the mean and standard deviation as well as a constant that is called the increase-factor (increase factor), and the previously mentioned inertia-threshold (inertia threshold). The fact that the mean and standard deviations change means that the value of the revised representation is set adaptively. For an embodiment, the increase-factor is experimentally set by setting it to different values and checking for the best performance on the manually labeled dataset. As previously described, for an embodiment, the manually labeled dataset is a set of sequences of sub-user data over time that have been manually inspected and classified as to whether or not the sub-user data contain changes that warrant detection from the change detection system. For an embodiment, best performance means that many (greater than a threshold or ratio) of the changes manually labeled as warranting change detection were correctly detected by the change detection system, and that few (less than a threshold or ratio) sequences that were manually labeled as are not warranting change detection were marked as changes by the change detection system FIG. 9 is a flow chart that includes steps of a method for determining a condition of a network by detecting changes in sub-user data, according to another embodiment. A first step 910 includes a. detecting, by a user server, sub-user data. A second step 920 includes b. receiving, by a platform server, the sub-user data over a period of time. A third step 930 includes c. determining, by the platform server, sub-user parameters including a mean, and a standard deviation of the sub-user data. A fourth step 940 d. generating a normalization value when the standard deviation is detected to be less than a deviation threshold. A fifth step 950 includes e. calculating, by the platform server, a value of deviation from expectation based at least on the mean, the normalization value, and a noise factor. A sixth step 960 includes f. calculating a current cumulative sum value of the sub-user data based on a prior cumulative sum value and the value of the deviation from expectation. A seventh step 970 includes g. comparing the current cumulative sum value with a preselected threshold. An eighth step 980 includes h. generating an informative electronic communication for the user server when the current cumulative sum value satisfies a compared condition with the preselected threshold, thereby indicating a determined condition of a network. A ninth step 990 includes i. repeating steps b-h.

For an embodiment, the platform server 101 further operates to detect a condition of a state of communication between the user server and the platform server when the current cumulative sum value satisfies a compared condition with the preselected threshold. For an embodiment, this indicates that the sub-user has greatly changed which can be used as an indication that the sub-user data being provided to the platform server is no longer valid data. Accordingly, it is assumed that somehow the sensing, collecting, or communicating of the sub-user data broke. For an embodiment, the condition detection threshold is based on the plurality of thresholds, which for an embodiment, are determined through simulation and experimentation of historical and theoretical scenarios for which a sub-user's data had issues.

For an embodiment, the calculation of the deviation from the expectation includes first calculating an absolute value for how much a given value deviates from the expectation by subtracting an exponentially moving mean from the value in question. In order to judge how surprising this deviation is, it is divided by the normalization value. The normalization value is based on the past standard deviation of the sub-user data which measures the variability of the historical data. The logic in dividing by this number is that data that varies a lot historically is likely to vary a lot going forward, and deviations in such highly variable data should be considered less surprising. The standard deviation will be larger for highly variable data and when dividing by that higher number, a smaller deviation from expectation is obtained. However, when the standard deviation becomes very small, division by such small values will tend to over inflate the importance of modest variations in the sub-user data, leading to false alarms. In order to limit these false alarms, the normalization value is not strictly equal to the standard deviation of the data. Instead, there is a lower threshold for how small the normalization value is allowed to get. When the standard deviation is lower than this threshold the normalization value takes on the value of the threshold instead.

Figure 10:
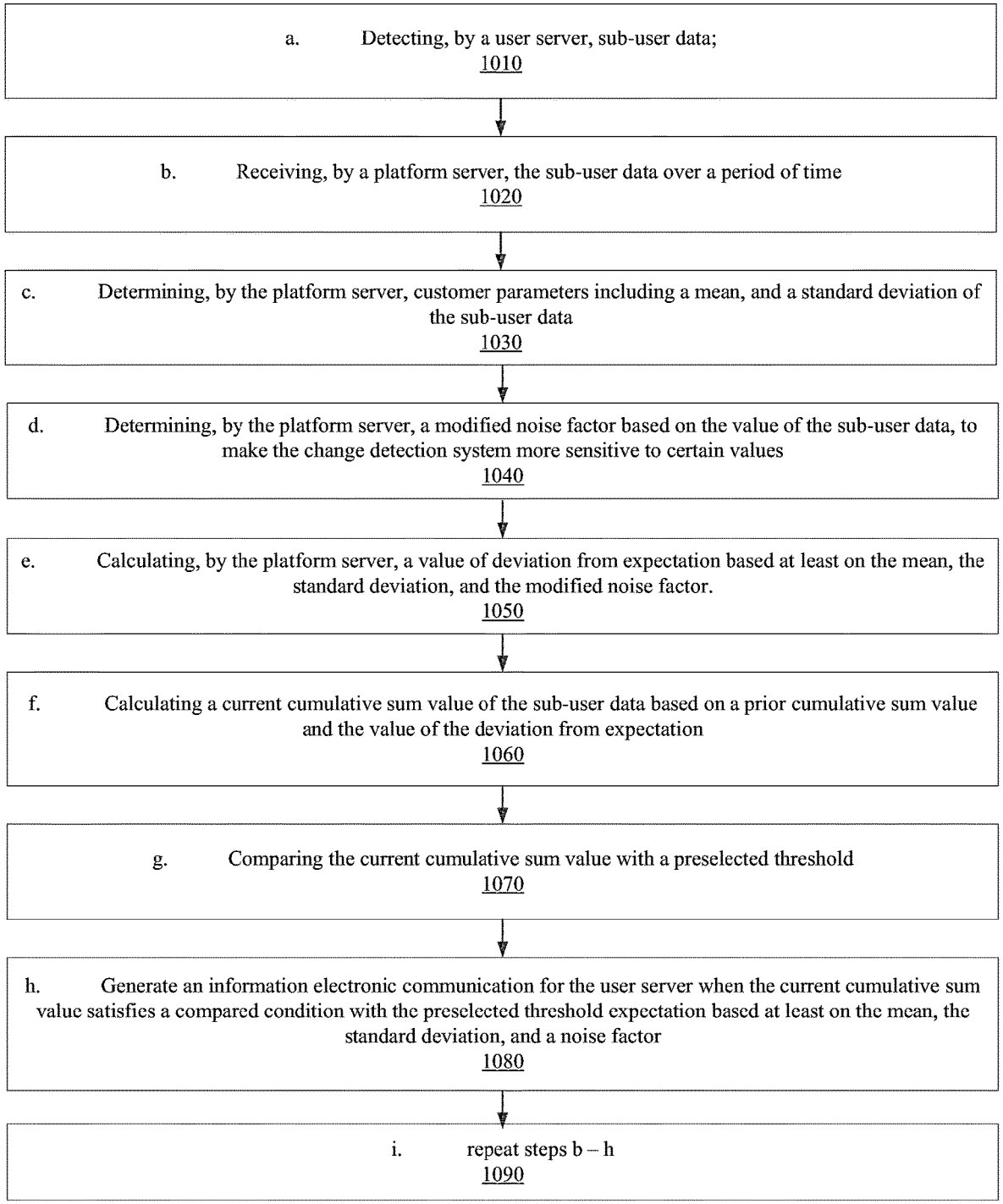
FIG. 10 is a flow chart that includes steps of a method for determining a condition of a network by detecting changes in sub-user data, according to another embodiment.

FIG. 10 is a flow chart that includes steps of a method for determining a condition of a network by detecting changes in sub-user data, according to another embodiment. A first step 1010 includes a. detecting, by a user server, sub-user data. A second step 1020 includes b. receiving, by a platform server, the sub-user data over a period of time. A third step 1030 includes c. determining, by the platform server, sub-user parameters including a mean, and a standard deviation of the sub-user data. A fourth step 1040 includes d. determining, by the platform server, a modified noise factor based on the value of the sub-user data, to make the change detection system more sensitive to certain values. A fifth step 1050 includes e. calculating, by the platform server, the value of deviation from expectation based at least on the mean, the standard deviation, and the modified noise factor. A sixth step 1060 includes f. calculating a current cumulative sum value of the sub-user data based on a prior cumulative sum value and the value of the deviation from expectation. A seventh step 1070 includes comparing the current cumulative sum value with a preselected threshold. An eighth step 1080 includes h. generating an informative electronic communication for the user server when the current cumulative sum value satisfies a compared condition with the preselected threshold, thereby indicating a determined condition of a network. A ninth step 1090 includes i. repeating steps b-h.

For an embodiment, the platform server 101 further operates to detect a condition of a state of communication between the user server and the platform server when the current cumulative sum value satisfies a compared condition with the preselected threshold. For an embodiment, this indicates that the sub-user has greatly changed which can be used as an indication that the sub-user data being provided to the platform server is no longer valid data. Accordingly, it is assumed that somehow the sensing, collecting, or communicating of the sub-user data broke. For an embodiment, the condition detection threshold is based on the plurality of thresholds, which for an embodiment, are determined through simulation and experimentation of historical and theoretical scenarios for which a sub-user's data had issues.

For an embodiment, the modified noise factor is determined based on the value of the sub-user data, to make the change detection system more sensitive to certain values. For an embodiment, the value of deviation from expectation is calculated based at least on the mean, the standard deviation, and the modified noise factor. For an embodiment, the modified noise factor controls how sensitive the change detection system is to changes in the sub-user data.

For an embodiment, the noise factor (modified noise factor) is used in the last step in the calculation of deviation from expectation. Because most processes are expected to produce values that differ from the expectation, a threshold can be used to control how large deviations should be considered normal. This is the role of the noise factor. By adding the noise factor in the calculation of the deviation from expectation, differences of sub-user data and historical mean that are small in relation to the normalization value will lead to a deviation from expectation value that is either 0 or positive. Only large negative deviations will lead to a negative deviation from expectation that accumulates in the cumulative sum value.

It is to be understood that the described embodiment can be applied to detect both positive and negative dips in the sub-user data. For an embodiment, the noise factor is experimented with and set to a value that causes the processing to accumulate the cumulative sum value when there are large positive deviations.

Figure 11:
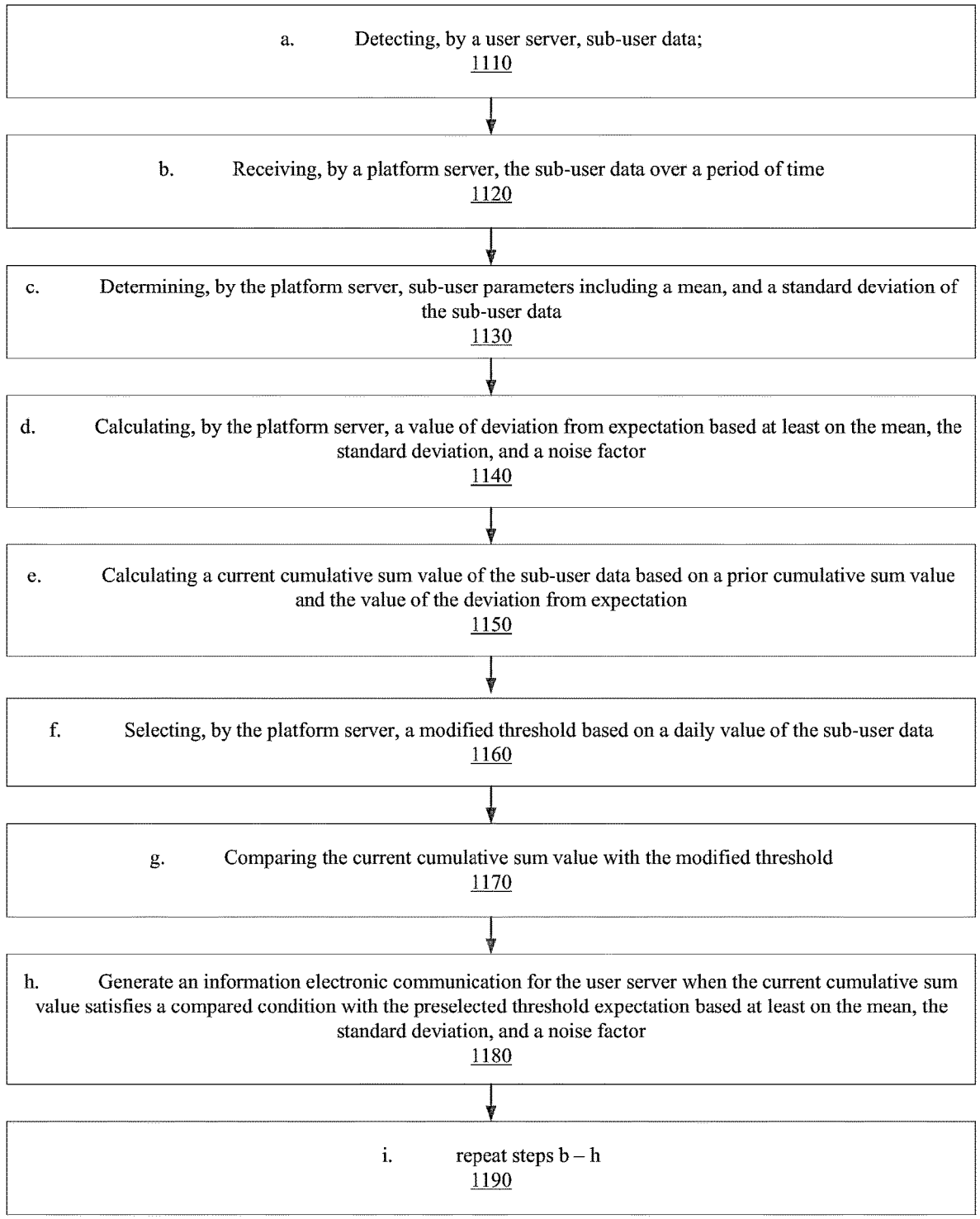
FIG. 11 is a flow chart that includes steps of a method for determining a condition of a network by detecting changes in sub-user data, according to another embodiment.

FIG. 11 is a flow chart that includes steps of a method for determining a condition of a network by detecting changes in sub-user data, according to another embodiment. A first step 1110 includes a. detecting, by a user server, sub-user data. A second step 1120 includes b. receiving, by a platform server, the sub-user data over a period of time. A third step 1130 includes c. determining, by the platform server, sub-user parameters including a mean, and a standard deviation of the sub-user data. A fourth step 1140 includes d. calculating, by the platform server, a value of deviation from expectation based at least on the mean, the standard deviation, and a noise factor. A fifth step 1150 includes e. calculating a current cumulative sum value of the sub-user data based on a prior cumulative sum value and the value of the deviation from expectation. A sixth step 1160 includes f. selecting, by the platform server, a modified threshold based on a set time period value of the sub-user data. A seventh step 1170 includes g. comparing the current cumulative sum value with the modified threshold. An eighth step 1180 includes h. generating an informative electronic communication for the user server when the current cumulative sum value satisfies a compared condition with the preselected threshold, thereby indicating a determined condition of a network. A ninth step 1190 includes repeating steps b-h.

For an embodiment, the platform server 101 further operates to detect a condition of a state of communication between the user server and the platform server when the current cumulative sum value satisfies a compared condition with the preselected threshold. For an embodiment, this indicates that the sub-user has greatly changed which can be used as an indication that the sub-user data being provided to the platform server is no longer valid data. Accordingly, it is assumed that somehow the sensing, collecting, or communicating of the sub-user data broke. For an embodiment, the condition detection threshold is based on the plurality of thresholds, which for an embodiment, are determined through simulation and experimentation of historical and theoretical scenarios for which a sub-user's data had issues.

Figure 12:
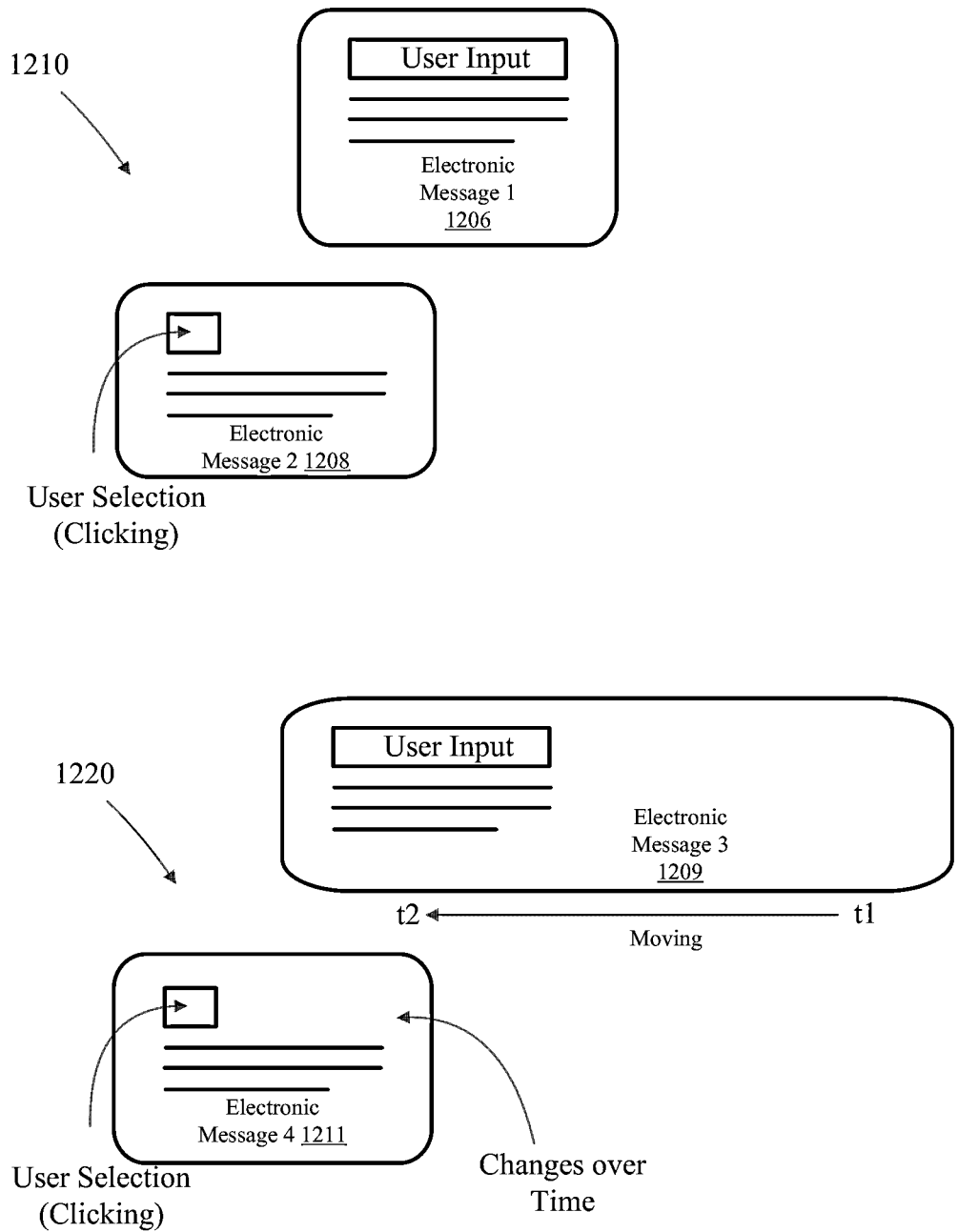
FIG. 12 shows electronic messages, wherein each electronic message includes different content or behavior, according to an embodiment.

FIG. 12 shows electronic messages, wherein each electronic message includes different content or behavior, according to an embodiment. For an embodiment, a display 1210 of an electronic message 1206 includes an input from a recipient (sub-user (site visitor), and an electronic message 1208 that provides a user input through, for example, a selection, such as, through a mouse click. A display 1220 includes an electronic message 1209 that changes positions on the display between times t1 and t2, and an electronic message 1211 that "pops up" a time t3 after the electronic message 1211 has been loaded. Clearly, other electronic messages having different content and behavior can be utilized. As shown, for an embodiment, the different electronic messages operate to control a display of the electronic messages on a display of a computing device (such as, computing devices 104, 106) of sub-users (such as, recipients) 108, 112). As stated, for an embodiment, the different electronic messages provide the electronic communications of the A/B testing.

For an embodiment, the electronic message includes a file configured to receive an input from a recipient of the electronic message. For an embodiment, the required input includes at least one or more of the recipients clicking to a different page, or the recipient entering information. For an embodiment, the electronic message is distinct from an underlying website which may include a dynamic and interactive page. For an embodiment, the electronic messages are distinct from the underlying website because the electronic messages appear visually and/or behaviorally distinct from the underlying page. For example, the behavior of the electronic message may include the electronic message popping up after the page is loaded or sliding out from the side after the rest of the page has been loaded. As previously described, the different templates of the A/B test control the behavior of the electronic message, and accordingly, control the display of a recipient of the electronic message.

Templates of Electronic Messages

For an embodiment, A/B testing includes N variations (arms) of templates that define electronic messages. For an embodiment, each of N templates includes a set of data objects that combine to represent a structure of an electronic message. As described, the first and second templates of the N templates of the electronic message each have a different content, a different send time, and/or a different behavior. The different displays of the mobile message can include a changing display, such as, movement or varying display intensity. Accordingly, the set of data objects of each of the first and second templates combine to represent a structure of electronic messages having a different content, different send times, or different behavior of the mobile messages. For an embodiment, the structure of the electronic message includes the content, the send time, or the behavior control. For an embodiment, the templates additional include information pertaining to testing of the mobile message(s). The additional information can include, for example, a test name, a description of the test (makes it easier to remember what is being tested), an ending date, and/or specific settings that correspond to statistical significance criteria. For an embodiment, the additional information pertaining to the testing combined with the data for the templates define a test.

For an embodiment, the messages 1206, 1208, 1209, 1211 may be electronic messages. For an embodiment, the electronic messages require an input. A first display of a computing device of an electronic message recipient includes an electronic message 1206 that requires an input from a user (electronic message recipient) and an electronic message 1208 that requires a user input through, for example, a selection, such as, through a click. A second display includes an electronic message 1209 that changes on the display between times t1 and t2, and an electronic message 1211 that is delivered a time t3 after the electronic message has been sent. Clearly, other electronic messages having different content, send times, and behavior can be utilized. For an embodiment, templates that have different send times are sent to the electronic message recipients at different times. For an embodiment, a different send time of the first template and the second template include a first send time for the first template and a second send time of the second template. For an embodiment, messages received at different times during the day may be more or less likely to achieve success, based on trends observed in both electronic messages and email. That is, electronic message recipient behavior can be observed by prior electronic messages to the electronic message recipient, or other types of electronic mail sent to the electronic message recipient. Based on the observer (sensed) prior behavior of the electronic message recipient, the first and second send times can be selected. Further, there can be legal restrictions on send times, which influence the times the server selects for the first and second send times.

For an embodiment, the electronic message includes a file configured to receive an input from an electronic message recipient. For an embodiment, the required input includes at least one or more of the site visitors clicking to a different page, or the site visitor entering information. However, as previously mentioned, sensors of mobile devices of the electronic message recipients can be utilized to determine or detect actions of the electronic message recipients that indicate changes in behavior of the electronic message recipient due to receiving the electronic messages of the different templates.

An embodiment includes counting the successes of the electronic message sent to electronic message recipients of, for example, a group 1 and a group 2 according to a template 1 and a template 2. As previously described, for an embodiment, successes of the electronic messages generally include determining how many of the electronic message recipients of the electronic messages are sensed and tracked or determined to have performed a task of the electronic message. For an embodiment, the tracked and monitored activities of the electronic message recipients are online activities. For an embodiment, mobile devices of the electronic message recipients are tracked, and the tracked and monitored activities include locations and motions of the electronic message recipients.

For an embodiment, the electronic message recipients are obtained by tracking information of electronic message recipients to the user website managed by the user of the user server 140. For an embodiment, the electronic message recipients include recent electronic message recipients. For an embodiment, recent electronic message recipients include electronic message recipients that have visited the user website within a predetermined time-period. For an embodiment, electronic message recipients include a selected number of most recent user website visitors. For an embodiment, recent site visitors include electronic message recipients since a specific event. For an embodiment, the specific event may include, for example, a large change in the settings of a template test. For an embodiment, the assignment is random with equal probabilistic distributions within each geographical region that the test is sent to. For example, the electronic message may be sent to electronic message recipients from N different geographical regions. For an embodiment, an equal number (or near equal) of electronic messages is sent to each of the geographical regions, but randomly sent to the electronic message recipients within each of the regions. For an embodiment, the assignment is deterministic but equally distributed within each of the geographical regions. For example, a first template 1 can be assigned to a first member of the list of planned electronic message recipients, a second template 2 can be assigned to a second member of the list of planned electronic message recipients, and the first template can be assigned to a third member of the list of planned electronic message recipients, and so on.

For at least some embodiments, an eligibility of the electronic message recipient is determined dynamically by a combination of a geolocation of the electronic message recipient, transactional (for example, purchase confirmation, delivery confirmation) vs. marketing purpose of the electronic message, and recency of the last electronic message received. For example, only electronic message recipients who have not received a marketing email and/or marketing electronic message within the past 24 hours (or some other predetermined or adaptive time period X) are eligible to receive this message. For an embodiment, the planned electronic message recipients are determined when an electronic message is scheduled for transmission to the electronic message recipients. For an embodiment, when the electronic message is sent, the time that each planned electronic message recipient received their most recent marketing electronic message is determined, and only those electronic message recipients that have not received an electronic message in the past X hours are deemed eligible electronic message recipients.

For an embodiment, content in the template(s) is dynamically updated based on actions or characteristics of the sub-user (recipient). For example, different images or content of electronic messages of the templates are sent to the electronic message recipients based on the last product that an electronic message recipient browsed. Further, the mobile devices of the electronic message recipients can be tracked and monitored. For an embodiment, the content of the templates is additionally updated by physical location and activities of the electronic message recipients. The physical location and the activities can be sensed and/or identified based on locations and motion sensed by sensors of the mobile devices of the electronic message recipients.

For an embodiment, at least one of the plurality of mobile devices includes a location sensor and one or more motion sensors, and wherein the at least one of the plurality of mobile devices tracks locations and motions of a user of the at least one of the plurality of mobile devices, and the locations and motions of the user are included in the collected test data from the testing including the electronic message recipient actions of the first template of the electronic message and the second template of the electronic message.

As previously described, the described embodiments solve practical problems associated with automatically generating by a server or computing apparatus electronic messages that are likely to solicit a response from recipients (sub-users) of the electronic messages. Further, the described embodiments further solve problems associated with automatically identifying messages and characteristics (including a behavior) of messages that are more or less likely to solicit the response from the recipients (sub-users). Further, the described embodiments further solve problems associated with tuning the generation and other characteristics of the electronic messages based on preferences and actions of users who input a description for the electronic messages and based on tracking and monitoring the actions of recipients (sub-users) of the electronic messages. The different electronic messages may include different content and/or behavior. Further, the described embodiments further solve problems associated with improving a user interface with the sub-users. That is, different user interfaces can be tested by varying the display provided to different sub-users. The responses detected or sensed from the sub-users in response to the different displays can be used to tune or improve the user interface of each of the sub-users. For an embodiment, the behavior can include the behavior of the display of the different electronic messages being different. For example, the display of different electronic messages may include motion of the display of the electronic messages. Accordingly, based on the sensed behavior of recipients of the electronic messages, the display may selectively vary. As shown in FIG. 12, the different behaviors of the electronic messages can include different motion and/or placement of features within a display of the electronic messages. For example, a selectable button within the display of the electronic messages can be located on the displays of the electronic messages based on the tracked actions and responses of the sub-users upon receiving the electronic messages. Locations and motions of the features of the displayed electronic messages can be adjusted based on the evaluated success of electronic messages having different locations and motion. Clearly other features, such as, text size, text location, text motion, fonts, colors, can additionally or alternatively be selected.

Although specific embodiments have been described and illustrated, the embodiments are not to be limited to the specific forms or arrangements of parts so described and illustrated. The described embodiments are to only be limited by the claims.

What is claimed:

1. A computer-implemented system for determining a condition of network communication between servers, comprising:
    a plurality of sub-user computing devices;
    a user server electronically connected to the plurality of sub-user devices, the user server operative to sense sub-user data of sub-users through the sub-user devices;
    a platform server electronically connected to the user server, the platform server configured to:
    receive the sub-user data of the sub-users from the user server;
    calculate a plurality of thresholds based on a size of the sub-user data;
    calculate a rolling mean for each sub-period of a larger period;
    generate difference values based on comparing current sub-period values to corresponding sub-period rolling mean;

accumulate a cumulative sum based on the difference values;

detect at least one anomaly based on comparing the cumulative sum with the plurality of thresholds;

detect a condition of a state of communication between the user server and the platform server when the comparing of the cumulative sum with the plurality of thresholds exceeds a condition detection threshold; and feed the condition of the state of communication back to the user server when the condition is detected.

2. The system of claim 1, wherein feeding the condition of the state back to the user server includes providing a communication update to a user of the user server indicating failure of communication of the sub-user data between the user server and the platform server.

3. The system of claim 1, wherein feeding the condition back to the user server includes controlling an update of a website of the user.

4. The system of claim 3, wherein controlling the update of the website includes automatically updating the website to a version implemented before the detection of the condition.

5. The system of claim 1, wherein the platform server is further configured to:

detect a sub-condition of the state of communication between the user server and the platform server when the comparing of the cumulative sum with the plurality of threshold is compared with a sub-condition detection threshold, wherein the sub-condition detection threshold is different than the condition detection threshold.

6. The system of claim 5, wherein the platform server is further configured to:

correlate the detection of the sub-condition with an activity of the user of the user-server.

7. The system of claim 1, wherein the platform server is further configured to:

receive the sub-user data over a period of time;

determine sub-user parameters including a mean, and a standard deviation of the sub-user data;

determine a modified noise factor based on a value of the sub-user data to make change detection more sensitive to certain values;

calculate a value of deviation from expectation based at least on the mean, the standard deviation, and the modified noise factor;

calculate a current cumulative sum value of the user data based on a prior cumulative sum value and the value of the deviation from expectation;

compare the current cumulative sum value with a preselected threshold;

detect the condition of the state of communication between the user server and the platform server when the current cumulative sum value satisfies a compared condition with the preselected threshold; and feed the condition of the state of communication back to the user server when the condition is detected.

8. The system of claim 7, wherein the platform server is further configured to:

generate a normalization value when the standard deviation is detected to be less than a deviation threshold; and wherein calculating the value of deviation from expectation is based at least on the mean, the normalization value, and the modified noise factor.

9. The system of claim 8, wherein the deviation threshold is determined by experimentally observing results on a manually labeled dataset for different values of the deviation threshold.

10. The system of claim 7, wherein the modified noise factor is used in a last step in calculation of a deviation from expectation, and wherein when the sub-user data and a historical mean are less than a preselected fraction of the normalization value, then the sub-user data and the historical mean provide a deviation from expectation value that is either zero or positive.

11. The system of claim 7, wherein the modified noise factor controls how sensitive the change detection system is to changes in the sub-user data.

12. The system of claim 1, wherein the platform server is further configured to:

receive the sub-user data over a period of time;

determine sub-user parameters including a mean, and a standard deviation of the sub-user data;

generate a normalization value based on the standard deviation when the standard deviation is detected to be less than a deviation threshold;

calculate a value of deviation from expectation based at least on the mean, the normalization value, and a noise factor;

calculate a current cumulative sum value of the sub-user data based on a prior cumulative sum value and the value of the deviation from expectation;

compare the current cumulative sum value with a preselected threshold;

detect a condition of a state of communication between the user server and the platform server when the current cumulative sum value satisfies a compared condition with the preselected threshold; and feed the condition of the state of communication back to the user server when the condition is detected.

13. The system of claim 12, wherein the platform server is further configured to:

detect a value change of the sub-user data; and generate a revised representation of the user data when the value change between the sub-user data and the previous determined mean, is detected to be greater than a change threshold;

wherein the sub-user parameters including a mean, and a standard deviation of the revised representation sub-user data.

14. The system of claim 13, wherein the revised representation of the sub-user data is lower.

15. The system of claim 13, wherein the platform server is further configured to:

determine the change threshold based on previously calculated mean and standard deviation of the sub-user data, and an inertia threshold, wherein the inertia threshold is experimentally determined by checking various values of the inertia threshold and determining a performance based on a manually labeled dataset.

16. The system of claim 13, wherein the revised representation of the sub-user data is adaptively determined based on previously calculated mean and standard deviation of the sub-user data, an increase factor, and an inertia threshold, wherein the increase factor is experimentally determined by checking various values of the increase factor and determining a performance with a manually labeled dataset.

17. The system of claim 1, wherein the sub-user data is generated based on sensing actions of a plurality of sub-users.

18. The system of claim 17, wherein the action of the plurality of sub-users includes actions of website visitors and includes one or more of online actions by the by the sub-users, and offline actions of the sub-users including physical motion of the sub-users and physical locations of the sub-users.

19. The system of claim 1, wherein calculating the plurality of thresholds based on the size of the periodic user data comprises:
   calculating a volume of events of sub-user data based on an average of a last N sub-periods of event volume;
   determining each of the plurality of thresholds based on the calculated volume of events, and previously determined minimum and maximum thresholds.

20. A method of detecting changes in sub-user behavior data for determining a state of communication between a user server and a platform server of a network comprising:
   sensing user data of sub-users;
   calculating, by the platform server, a plurality of thresholds based on a size of the user data;
   calculating, by the platform server, a rolling mean for each sub-period of a larger period;
   generating, by the platform server, difference values based on comparing current sub-period values to corresponding sub-period rolling mean;
   accumulating, by the platform server, a cumulative sum based on the difference values;
   detecting, by the platform server, an anomaly based on comparing the cumulative sum with the plurality of thresholds;
   detecting, by the platform server, a condition of a state of communication between the user server and the platform server when the comparing of the cumulative sum with the plurality of threshold exceeds a condition detection threshold; and
   feeding, by the platform server, the condition of the state of communication back to the user server when the condition is detected.

* * * * *